(12) United States Patent
Adema et al.

(10) Patent No.: US 12,169,277 B2
(45) Date of Patent: Dec. 17, 2024

(54) DISPLAY SYSTEM WITH VARIABLE BEAM EXPANSION FOR MULTIPLE LASERS

(71) Applicant: GOOGLE LLC, Mountain View, CA (US)

(72) Inventors: Daniel Adema, Kitchener (CA); Ian Andrews, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 597 days.

(21) Appl. No.: 17/374,078

(22) Filed: Jul. 13, 2021

(65) Prior Publication Data

US 2023/0015702 A1    Jan. 19, 2023

(51) Int. Cl.
| | | |
|---|---|---|
| *G02B 27/01* | (2006.01) | |
| *G02B 26/08* | (2006.01) | |
| *G02B 26/12* | (2006.01) | |

(52) U.S. Cl.
CPC ..... *G02B 27/0172* (2013.01); *G02B 26/0816* (2013.01); *G02B 26/123* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 2013/0300999 A1* | 11/2013 | DeJong | H04N 9/3129 351/158 |
| 2015/0055078 A1 | 2/2015 | Johnstone et al. | |
| 2016/0234469 A1 | 8/2016 | Reitterer et al. | |

OTHER PUBLICATIONS

Thorlabs, "Importance of Beam Circularization," https://www.thorlabs.com/images/TabImages/Elliptical_Beam_Circularization_Lab_Fact.pdf, Accessed Sep. 17, 2020, 18 pages.
Edmund Optics, "Effects of Laser Mirror Surface Flatness," https://www.electrooptics.com/sites/default/files/content/white-paper/pdfs/Effects%20of%20Laser%20Mirror%20Surface%20Flatness.pdf, Accessed Sep. 17, 2020, 3 pages.
Oechsner, Ulrich, et al., "Anamorphic Shaping of Laser Beams," https://onlinelibrary.wiley.com/doi/pdf/10.1002/phvs.201900031, Accessed Jul. 2021, 4 pages.
International Search Report and Written Opinion mailed Oct. 28, 2022 for PCT Application No PCT/US2022/036445, 18 pages.

(Continued)

*Primary Examiner* — Bao-Luan Q Le
*Assistant Examiner* — Danell L Owens

(57) ABSTRACT

Display systems, such as near eye display systems or wearable heads up displays, may include a laser projection system having an optical engine and an optical scanner. Light output by the optical engine may be directed into the optical scanner as two angularly separated laser light beams. The angularly separated laser light beams typically have different angles of incidence on a second scan mirror of the optical scanner. Respectively different levels of magnification are applied to the beam diameter of each of the angularly separated laser light beams in a first dimension, such that the angularly separated laser light beams have respectively different beam diameters upon incidence at the second scan mirror. In some embodiments, the different beam diameters of the angularly separated laser light beams result in regions of incidence of each of the angularly separated laser light beams on the second scan mirror being equal or substantially similar.

20 Claims, 14 Drawing Sheets

(56) References Cited

OTHER PUBLICATIONS

Reitterer, Jorg et al., "Beam-clipping-induced Diffraction Effects in MEMS Laser Scanners for Autostereoscopic Outdoor Displays", Sensors and Actuators A: Physical 233 (2015), 8 pages.
International Preliminary Report on Patentability mailed Jan. 25, 2024 for PCT Application No PCT/US2022/036445, 11 pages.

* cited by examiner

DISPLAY SYSTEM WITH VARIABLE BEAM EXPANSION FOR MULTIPLE LASERS

BACKGROUND

Some display systems employ a projector, which is an optical device that projects or shines a pattern of light onto another object (e.g., onto a surface of another object, such as onto a projection screen) in order to display an image or video on or via that other object. In projectors employing lasers as light sources (that is, in a "laser projector"), each beam of laser light generated by the laser projector is temporally modulated to provide a pattern of laser light and controllable mirrors, such as digital micromirrors, are typically used to spatially distribute the modulated pattern of laser light over a two-dimensional area of another object. The spatial distribution of the modulated pattern of laser light produces an image at the other object.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
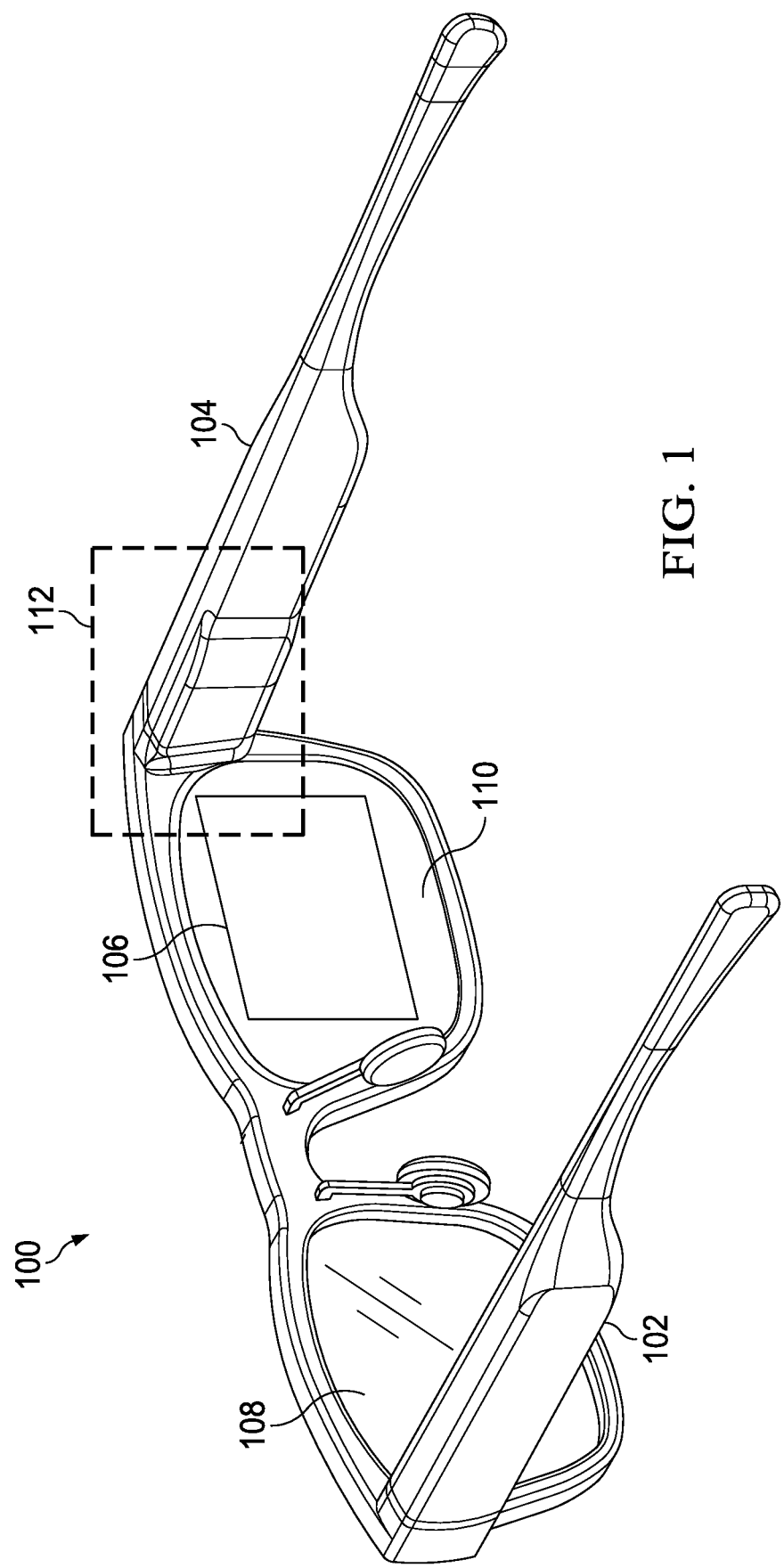
FIG. 1 is a diagram illustrating a display system having an integrated laser projection system, in accordance with some embodiments.

FIGS. 1-14 illustrate embodiments for compactly arranging a near-eye display system (e.g., a wearable heads-up display (WHUD)) or another display system having multiple angularly separated laser inputs to which respectively different magnitudes of beam expansion are applied by different reflective surfaces of an optical relay. Using the techniques described herein, two or more laser inputs (sometimes referred to herein as "laser light beams") of such a display system are angularly separated with respect to one another, so that the two or more laser light beams propagate along optical paths that are not parallel or perpendicular, but are instead tilted (i.e., "angularly offset", "angularly separated") with respect to one another. Due to the angular separation of the two or more laser light beams, the respective angles of incidence of such laser light beams upon one or more scan mirrors of an optical scanner of the system typically differ, resulting in respectively differently sized regions of incidence of the laser light beams on such scan mirrors for laser light beams having the same or similar beam diameters, which can impact the performance and the user experience with the WHUD. In order to compensate for the differences in respective angles of incidence and corresponding areas of regions of incidence of such angularly separated light beams, respectively different levels of beam expansion (i.e., magnification) are applied to each of the angularly separated laser light beams, such that, in some embodiments, the areas of the respective regions of incidence of the angularly separated laser light beams on a given scan mirror of the optical scanner are the same or approximately the same.

To further illustrate, in some cases providing laser light beams with regions of incidence on the scan mirror that are significantly larger or smaller than the reflective surface of the scan mirror. For example, portions of the angularly separate laser light beams missing the reflective surface of the scan mirror result in a loss of brightness in images projected by the near-eye display system. By reducing the level magnification applied to any laser light beams of the angularly separated laser light beams that would otherwise have a region of incidence larger in area than the reflective surface of the scan mirror, the brightness of the images can be maintained at a relatively high level. As another example, providing laser light beams with regions of incidence that are smaller in area than the reflective surface of the scan mirror results in underutilization of the reflective surface of the scan mirror and a corresponding reduction in optical resolution of the near-eye display. By increasing the level of magnification applied to any laser light beams of the angularly separated laser light beams that would otherwise have regions of incidence that are smaller in area than the reflective surface of the scan mirror, this underutilization of the reflective surface is mitigated.

In some embodiments of the techniques disclosed herein, the display system includes a laser projection system that includes an optical engine having at least two modulatable laser light sources, two scan mirrors, an optical relay, and a waveguide. In operation, the at least two modulatable laser light sources provide laser light (output as two or more angularly separated laser light beams), the two scan mirrors receive the laser light in series, and each scan the laser light over a respective direction (e.g., a first scan mirror may scan the light along a first dimension and a second scan mirror may scan the light along a second dimension, where the second dimension may be substantially perpendicular to the first dimension). The waveguide includes an incoupler at which it receives the scanned laser light from the second scan mirror. The incoupler redirects received light through the waveguide, in some instances via an intervening exit pupil expander (EPE) toward an outcoupler of the waveguide so that the light is projected out of the waveguide (e.g., onto the eye of a user).

In some embodiments of such display systems, two angularly separated laser light beams are output (e.g., via the optical engine and a beam combiner) to an optical scanner that includes the first and second scan mirrors and the optical relay. The display system is arranged such that a first laser light beam of the two angularly separated laser light beams is incident upon the first scan mirror, which scans the first laser light beam along a first scanning dimension onto a first reflective surface of the optical relay. The second laser light beam of the two angularly separated laser light beams is also incident upon the first scan mirror, which scans the second laser light beam along the first scanning dimension onto a second reflective surface of the optical relay. The first reflective surface directs the first laser light beam toward a third reflective surface of the optical relay. The second reflective surface directs the second laser light beam toward a fourth reflective surface of the optical relay. The third reflective surface directs the first laser light beam toward a second scan mirror, which scans the first laser light beam across a first region of an incoupler of a waveguide along a second scanning dimension that is at least substantially perpendicular to the first scanning dimension. The fourth reflective surface directs the second laser light beam toward the second scan mirror, which scans the second laser light beam across a second region of the incoupler of the waveguide along the second scanning dimension. In some embodiments, the first region of the incoupler partially overlaps the second region of the incoupler.

In some embodiments, the first and second reflective surfaces of the optical relay are non-overlapping reflective surfaces of a molded optical relay. In some embodiments, the third and fourth reflective surfaces of the optical relay are non-overlapping surfaces of the molded optical relay. In some embodiments, the first reflective surface expands the beam diameter (sometimes referred to herein as performing beam expansion or magnifying) of the first laser light beam with a first magnitude along a first "non-scanning" dimension that is perpendicular or substantially perpendicular to the scanning dimension and to the direction of propagation of the first laser light beam. In some embodiments, the second reflective surface expands the beam diameter of the second laser light beam with a second magnitude along a second non-scanning dimension that is perpendicular or substantially perpendicular to the scanning dimension and to the direction of propagation of the second laser light beam. In some embodiments, the first magnitude is different from the second magnitude. In some embodiments, the first reflective surface has an optical prescription that is different from a second optical prescription of the second reflective surface, resulting in respectively different magnitudes of beam expansion being applied by the first reflective surface to the first laser light beam and by the second reflective surface to the second laser light beam along the first and second non-scanning dimensions, respectively.

Generally, as the angle of incidence of a given laser light beam upon a surface (such as that of a scan mirror) deviates from being normal to that surface, the area of a region of the surface upon which the laser light beam is incident increases. The region of a surface upon which a laser light beam is incident is sometimes referred to herein as a "region of incidence". If, in the case of a laser projection system, the region of incidence for a given laser light beam and a given scan mirror is larger than the reflective surface of the scan mirror, then the portion of the laser light beam that is not incident on the reflective surface is not reflected by the scan mirror (a scenario sometimes referred to as "clipping" or "aperture clipping"), resulting in a loss of brightness of images displayed using the laser projection system. Particularly in embodiments of the laser projection system of the present disclosure, which utilizes two or more angularly separated laser light beams as inputs, each laser light beam will typically have respectively different angles of incidence on the second scan mirror, resulting in respectively different sized regions of incidence on the second scan mirror. Assuming that each of the laser light beams input to the laser projection system initially have the same or substantially the same beam diameter and have respectively different angles of incidence on the second scan mirror, the regions of incidence of the laser light beams on the second scan mirror will have different sizes if the same level (i.e., magnitude) of beam expansion is applied along the respective non-scanning dimensions of each of the laser light beams via the reflective surfaces of the optical relay, which results in non-idealities. For example, if at least one of the regions of incidence of the laser light beams exceed the size of the reflective surface of the second scan mirror, clipping and a loss of brightness of the projected image will undesirably result. This loss of brightness can be mitigated by instead applying a reduced level of magnification to any laser light beams having regions of incidence with respective areas that exceed (e.g., significantly exceed) that of the reflective surface of the second scan mirror. As another example, if at least one of the laser light beams has a region of incidence on the second scan mirror that is smaller (e.g., significantly smaller) than the reflective surface of the second scan mirror, then the optical resolution of the projected image will be undesirably reduced. This reduction in optical resolution can be mitigated by instead applying a greater level of magnification to any laser light beams having regions of incidence with respective areas that are less than (e.g., significantly less than) that of the reflective surface of the second scan mirror.

As established above, by applying respectively different levels of beam expansion to angularly separated laser light beams of such a laser projection system along their respective non-scanning dimensions (the different levels of beam expansion being applied, for example, via respectively different reflective surfaces of the optical having respectively different optical prescriptions), the size of the respective regions of incidence of each of the angularly separated laser light beams on the second scan mirror can be independently selected. For example, by applying respectively different levels of beam expansion to first and second angularly separated laser light beams along their respective non-scanning dimensions, where the first and second angularly separated laser light beams have the same initial beam diameter and respectively different angles of incidence onto the second scan mirror, a first region of incidence of the first laser light beam is set to be equal or approximately equal to a second region of incidence of the second laser light beam and, in some embodiments, is set to be equal or approximately equal to the size of the reflective surface of the second scan mirror.

In accordance with embodiments of the present disclosure, laser projection systems are provided which include optical relays having reflective surfaces with different optical prescriptions, which cause respectively different levels of beam expansion to be applied to angularly separated laser light beams that are respectively incident on the reflective surfaces. In some embodiments, the different levels of beam expansion are applied along respective non-scanning dimensions of the angularly separated laser light beams, and cause the angularly separated laser light beams to have respective regions of incidence on the second scan mirror that are of respectively similar or the same size with respect to one another, with respect to the reflective surface of the second scan mirror, or both.

It should be noted that, although some embodiments of the present disclosure are described and illustrated with reference to a particular example near-eye display system in the form of a wearable-heads-up display (WHUD), it will be appreciated that the apparatuses and techniques of the present disclosure are not limited to this particular example, but instead may be implemented in any of a variety of display systems using the guidelines provided herein.

FIG. 1 illustrates an example display system 100 employing a scanning-based optical system in accordance with some embodiments having support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is a near-eye display system in the form of a WHUD in which the support structure 102 is configured to be worn on the head of a user and has a general shape and appearance (that is, form factor) of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1. It should be understood that instances of the term "or" herein refer to the non-exclusive definition of "or", unless noted otherwise. For example, herein the phrase "X or Y" means "either X, or Y, or both".

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more light-emitting diodes (LEDs) and a dynamic reflector mechanism such as one or more dynamic scanners or digital light processors. In some embodiments, the projector includes multiple laser diodes (e.g., a red laser diode, a green laser diode, and a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
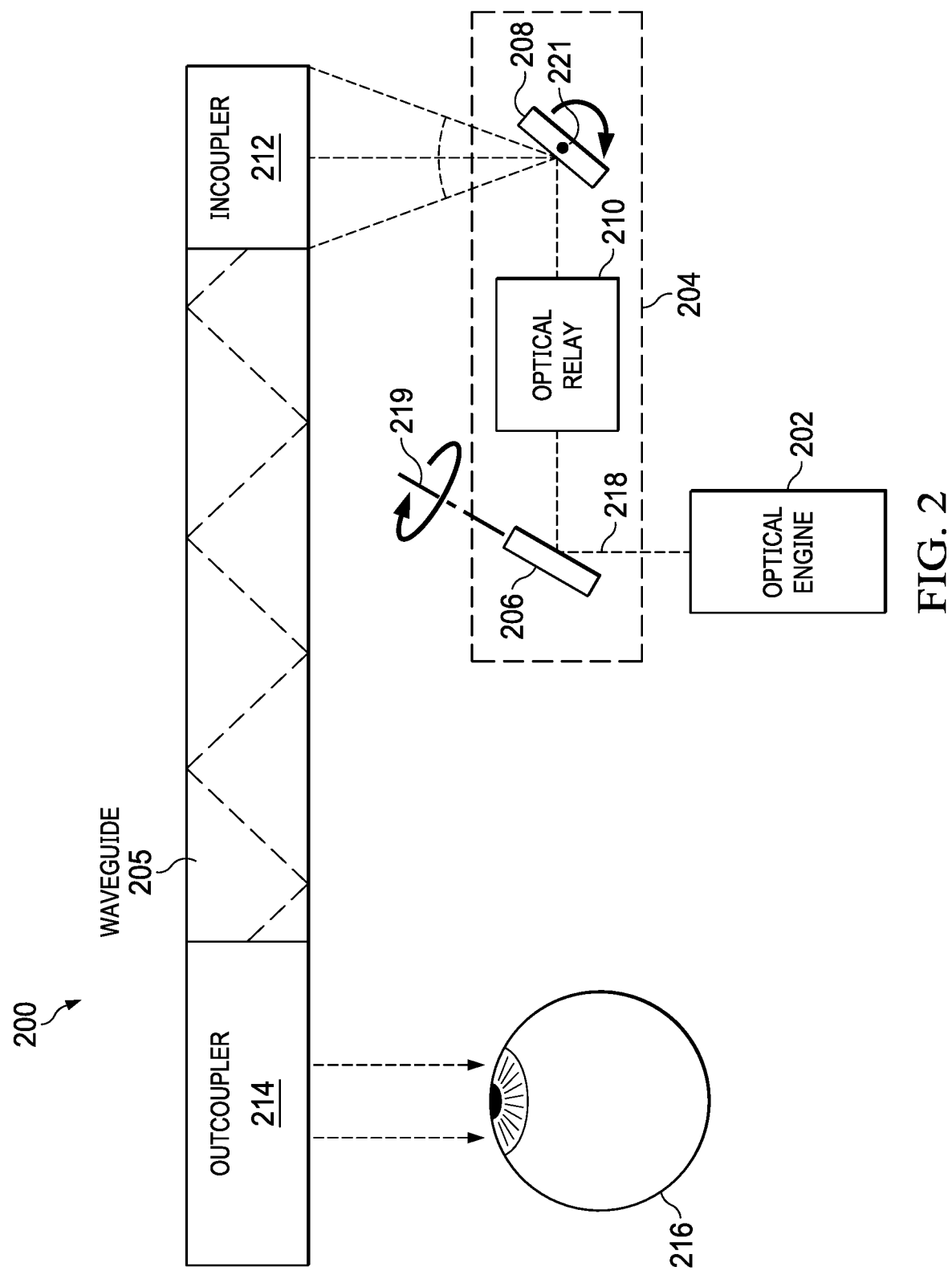
FIG. 2 is a diagram illustrating a laser projection system having an optical scanner that includes an optical relay disposed between two scan mirrors, in accordance with some embodiments.

FIG. 2 illustrates a simplified block diagram of a laser projection system 200 that projects images directly onto the eye of a user via laser light. The laser projection system 200 includes an optical engine 202, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. In some embodiments, the laser projection system 200 is implemented in a wearable heads-up display or another display system, such as the display system 100 of FIG. 1.

The optical engine 202 includes one or more laser light sources configured to generate and output laser light 218 (e.g., visible laser light such as red, blue, and green laser light and, in some embodiments, non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during operation of the laser projection system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the first and second scan mirrors 206 and 208 of the optical scanner 204 are MEMS mirrors in some embodiments. For example, the first scan mirror 206 and the second scan mirror 208 are MEMS mirrors that are driven by respective actuation voltages to oscillate during active operation of the laser projection system 200, causing the first and second scan mirrors 206 and 208 to scan the laser light 218. Oscillation of the first scan mirror 206 causes laser light 218 output by the optical engine 202 to be scanned through the optical relay 210 and across a surface of the second scan mirror 208. The second scan mirror 208 scans the laser light 218 received from the first scan mirror 206 toward an incoupler 212 of the waveguide 205. In some embodiments, the first scan mirror 206 oscillates or otherwise rotates around a first axis 219, such that the laser light 218 is scanned in only one dimension (i.e., in a line) across the surface of the second scan mirror 208. In some embodiments, the second scan mirror 208 oscillates or otherwise rotates around a second axis 221. In some embodiments, the first axis 219 is skew with respect to the second axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 (e.g., via collimation) in the first dimension to an exit pupil plane of the optical relay 210 beyond the second scan mirror 208. Herein, a "pupil plane" refers to a location along the optical path of laser light through an optical system where the laser light converges to an aperture along one or more dimensions. For example, the optical relay 210 may be associated with one or more entrance pupil planes located along the optical path of laser light through the optical system where the laser light converges to a virtual aperture before entering the optical relay 210. For example, the optical relay 210 may be associated with one or more exit pupil planes located along the optical path of laser light through the optical system where the laser light converges to a virtual aperture along one or more dimensions after exiting the optical relay 210. In some embodiments, an entrance pupil plane of the optical relay 210 may be located coincident with the first scan mirror 206. In some embodiments, an entrance pupil plane of the optical relay 210 may be located at an intermediate location between the first scan mirror 206 and the optical relay 210. In some embodiments, an exit pupil plane of the optical relay 210 may be located coincident with the second scan mirror 208. In some embodiments, an exit pupil plane of the optical relay 210 may be located coincident with the incoupler 212.

In some instances, the laser light converges to a virtual aperture of a first entrance pupil plane along a first dimension (e.g., with the laser light converging along the x-y dimension to a point or line along a z dimension with respect to a cartesian coordinate system having x-, y-, and z-axes) and converges to a virtual aperture of a second entrance pupil plane along a second dimension (e.g., the second dimension being substantially perpendicular to the first dimension), where the first and second entrance pupil planes differ with respect to location. In some instances, the laser light converges to a virtual aperture of a first exit pupil plane along a first dimension (e.g., with the laser light converging along the x-y dimension to a point or line along a z dimension with respect to a cartesian coordinate system having x-, y-, and z-axes) and converges to a virtual aperture of an exit entrance pupil plane along a second dimension (e.g., the second dimension being substantially perpendicular to the first dimension), where the first and second exit pupil planes differ with respect to location. In other instances, the laser light converges to a virtual aperture of a single entrance pupil plane along all dimensions (e.g., with the laser light converging to the virtual aperture along each of the x, y, and z dimensions) and converges to a virtual aperture of a single exit pupil plane along all dimensions. While, in the present example, the optical engine 202 is shown to output a single beam of laser light 218 (which itself may be a combination of two or more beams of light having respectively different polarizations or wavelengths) toward the first scan mirror, in some embodiments, the optical engine 202 is configured to generate and output two or more laser light beams toward the first scan mirror, where the two or more laser light beams are angularly separated with respect to one another (i.e., they are "angularly separated laser light beams"). As described previously, two or more laser light beams are "angularly separated" when they propagate along respectively different non-parallel and non-perpendicular optical paths that are tilted (e.g., angularly offset) with respect to one another, with the angular separation of the optical paths, in some instances, causing the two or more laser light beams to converge to overlap one another along one or more dimensions (e.g., such overlap corresponding to a virtual aperture of a pupil plane).

In the present example, the possible optical paths of the laser light 218, following reflection by the first scan mirror 206, are initially spread along a first scanning dimension, but later these paths intersect at an exit pupil plane beyond the second scan mirror 208 due to convergence introduced by the optical relay 210. For example, the width (i.e., smallest dimension) of a given exit pupil plane approximately corresponds to the diameter of the laser light corresponding to that exit pupil plane. Accordingly, the exit pupil plane can be considered a "virtual aperture". In some embodiments, the exit pupil plane of the optical relay 210 is coincident with the incoupler 212. In some embodiments, an entrance pupil plane of the optical relay 210 is coincident with the first scan mirror 206.

According to various embodiments, the optical relay 210 includes one or more spherical, aspheric, parabolic, or freeform lenses that shape and relay the laser light 218 on the second scan mirror 208 or includes a molded reflective relay that includes two or more optical surfaces that include, but are not limited to, spherical, aspheric, parabolic, or freeform lenses or reflectors (sometimes referred to as "reflective surfaces" herein), which shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil plane of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes an edge-emitting laser (EEL) that emits a laser light 218 having a substantially elliptical, non-circular cross-section, and the optical relay 210 magnifies or minimizes the laser light 218 along one or both of a first direction (e.g., the semi-major axis of the beam profile of the laser light 218) or a second direction (e.g., the semi-minor axis of the beam profile of the laser light 218) to reshape (e.g., circularize) the laser light 218 prior to the convergence of the laser light 218 on the second scan mirror 208. In some such embodiments, a surface of a mirror plate of the first scan mirror 206 is elliptical and non-circular (e.g., similar in shape and size to the cross-sectional area of the laser light 218). In other such embodiments, the surface of the mirror plate of the first scan mirror 206 is circular.

The waveguide 205 of the laser projection system 200 includes the incoupler 212 and the outcoupler 214. The term "waveguide," as used herein, will be understood to mean a combiner using one or more of total internal reflection (TIR), specialized filters, or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Although not shown in the example of FIG. 2, in some embodiments additional optical components are included in any of the optical paths between the optical engine 202 and the first scan mirror 206, between the first scan mirror 206 and the optical relay 210, between the optical relay 210 and the second scan mirror 208, between the second scan mirror 208 and the incoupler 212, between the incoupler 212 and the outcoupler 214, or between the outcoupler 214 and the eye 216 (e.g., in order to shape the laser light for viewing by the eye 216 of the user). In some embodiments, a prism is used to steer light from the second scan mirror 208 into the incoupler 212 so that light is coupled into incoupler 212 at the appropriate angle to encourage propagation of the light in waveguide 205 by TIR. Also, in some embodiments, an exit pupil expander (e.g., an exit pupil expander 304 of FIG. 3, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
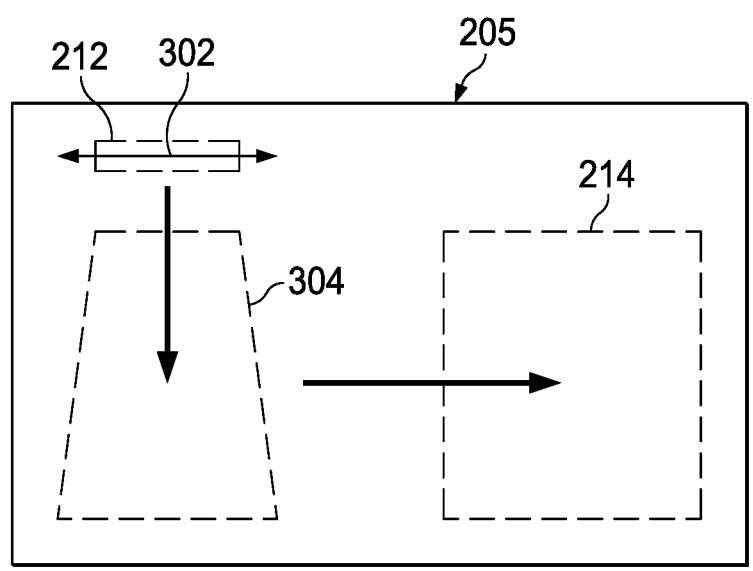
FIG. 3 is a diagram illustrating a waveguide having an incoupler, outcoupler, and exit pupil expander, in accordance with some embodiments.

FIG. 3 shows an example of light propagation within the waveguide 205 of the laser projection system 200 of FIG. 2 in accordance with some embodiments. As shown, light received via the incoupler 212, which is scanned along the scanning dimension 302, is directed into an exit pupil expander 304 and is then routed to the outcoupler 214 to be output (e.g., toward the eye of the user). In some embodiments, the exit pupil expander 304 expands one or more dimensions of the eyebox of a display system (e.g., the display system 100 of FIG. 1; the WHUD 600, 702 of FIGS. 6 and 7) that includes the laser projection system 200 (e.g., with respect to what the dimensions of the eyebox of the display would be without the exit pupil expander 304). In some embodiments, the incoupler 212 and the exit pupil expander 304 each include respective one-dimensional diffraction gratings (i.e., diffraction gratings that extend along one dimension), which diffract incident light in a particular direction depending on the angle of incidence of the incident light and the structural aspects of the diffraction gratings. It should be understood that FIG. 3 shows a substantially ideal case in which the incoupler 212 directs light straight down (with respect to the presently illustrated view) in a first direction that is perpendicular to the scanning dimension 302, and the exit pupil expander 304 directs light to the right (with respect to the presently illustrated view) in a second direction that is perpendicular to the first direction. While not shown in the present example, it should be understood that, in some embodiments, the first direction in which the incoupler 212 directs light is slightly or substantially diagonal, rather than exactly perpendicular, with respect to the scanning dimension 302.

Figure 4:
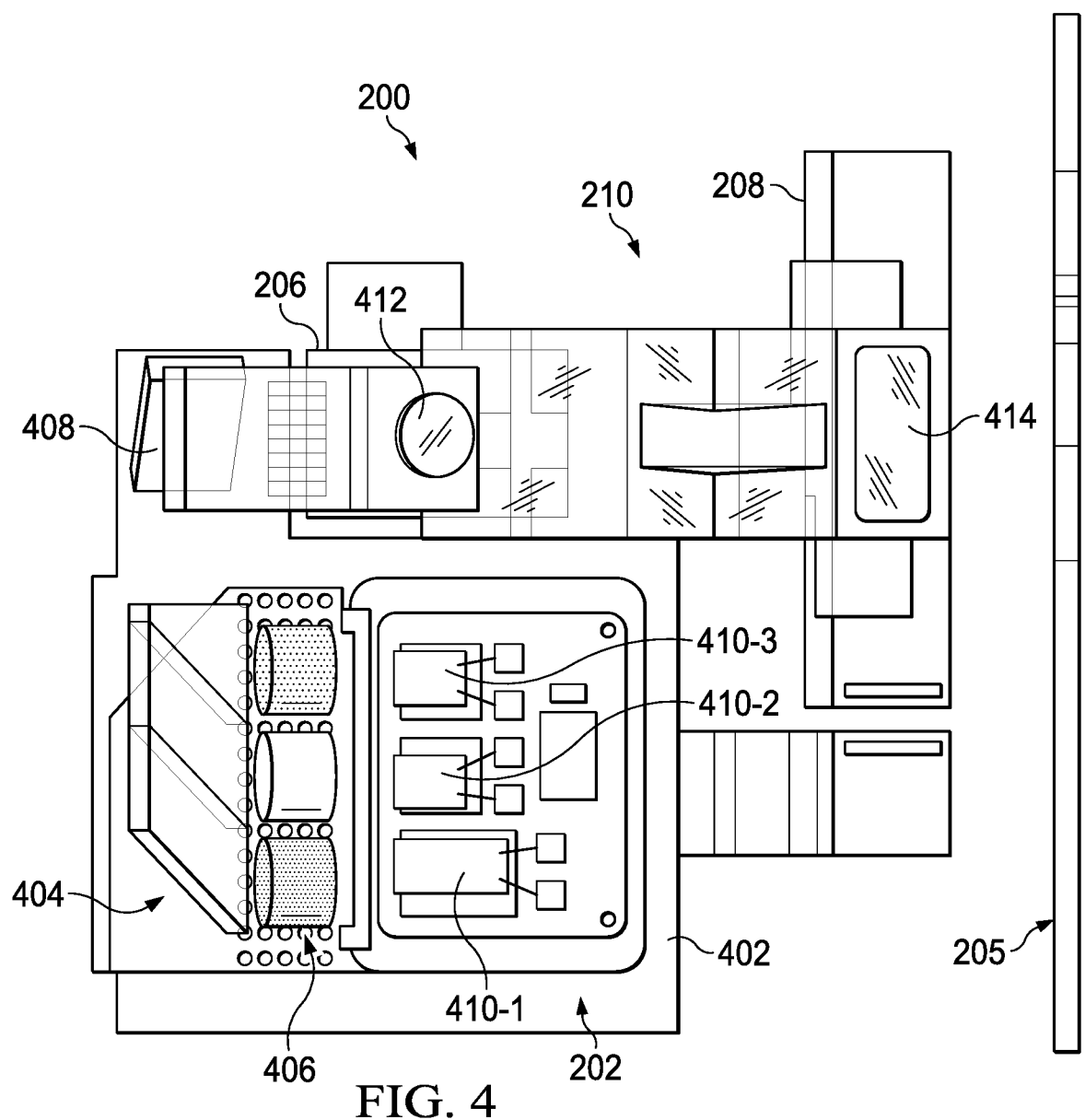
FIG. 4 is a diagram illustrating a laser projection system that includes a molded reflective relay disposed between two scan mirrors, in accordance with some embodiments.

FIG. 4 shows an example embodiment of the laser projection system 200 in which the optical relay 210 includes a molded reflective relay. As shown, the laser projection system 200 includes a substrate 402 on which a beam combiner 404, primary lenses 406, and a mirror 408 are disposed. According to various embodiments, the substrate 402 is a printed circuit board (PCB) or otherwise another applicable substrate.

The optical engine 202 comprises a set of one or more laser light sources 410 (e.g., laser diodes), such as the illustrated red laser light source 410-1, green laser light source 410-2, and blue laser light source 410-3, wherein a processor or other controller operates the optical engine 202 to modulate the respective intensity of each laser light source 410 so as to provide a corresponding red light, green light, and blue light contribution to a corresponding pixel of an image being generated for display to the user. The primary lenses 406 includes a corresponding number of collimation lenses (e.g., three for the three laser light sources 410 in the example above), each interposed in the light path between a respective laser light source 410 of the optical engine 202 and the beam combiner 404. For example, each laser light source 410 outputs a different wavelength of laser light (e.g., corresponding to respective red, blue, and green wavelengths) through the primary lenses 406 to be combined at the beam combiner 404 to produce the laser light (i.e., laser light 218 shown in FIG. 2) to be projected by the laser projection system 200. The beam combiner 404 receives the individual laser light inputs and outputs a combined laser light 218 to the mirror 408, which redirects the laser light 218 onto a reflective surface 412 of the first scan mirror 206. The first scan mirror 206 scans the laser light 218 into the optical relay 210 along a first scanning dimension.

In the example of FIG. 4, the optical relay 210 is a molded reflective relay, which may be, for example, molded from a solid clear component (e.g., glass or an optical plastic such as Zeonex) and the reflective surfaces thereof are implemented as mirror coatings or metasurfaces. In some embodiments, one or more reflective surfaces of the molded reflective relay 1802 reflect light via TIR and therefore do not require mirror coatings or fabricated metasurfaces to reflect light. Such molding can simplify the fabrication of the laser projection system 200 as it facilitates the incorporation of some or all of the optical surfaces of the relay into a single element, rather than several distinct, separate elements. Further, in some embodiments, the use of a molded structure allows for light to be propagated through one or more regions of the molded reflective relay 1802 via TIR, rather using mirror coatings to propagate light through those regions.

The optical relay 210 is configured to route the laser light 218 toward a reflective surface 414 of the second scan mirror 208. The second scan mirror 208 scans the laser light 218 across the incoupler (such as the incoupler 212) of the waveguide 205 along a second scanning dimension. In some embodiments, the second scanning dimension is perpendicular to the plane along which the laser light propagates through the optical relay 210.

Figure 5:
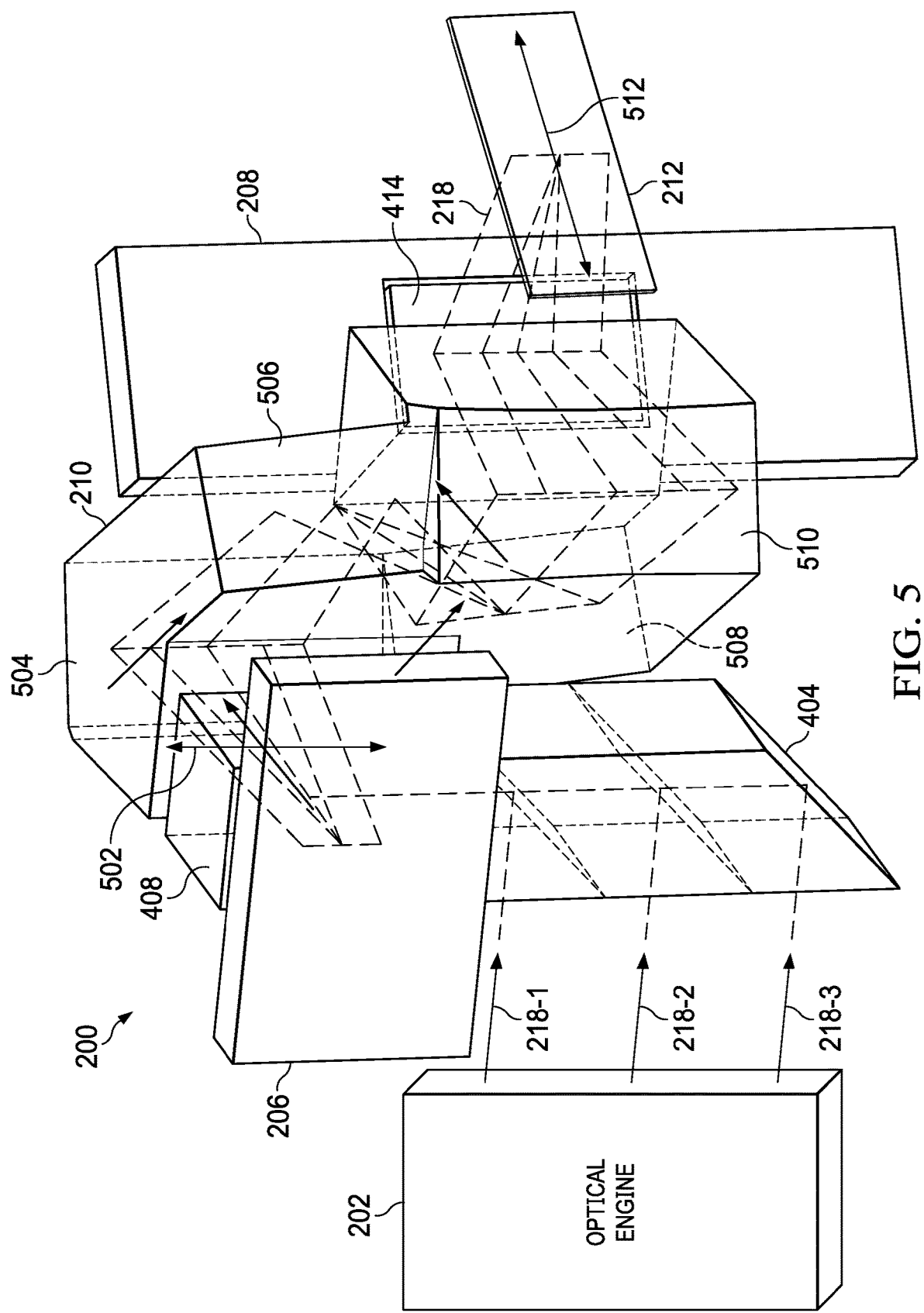
FIG. 5 is a diagram illustrating a laser projection system that includes a molded reflective relay disposed between two scan mirrors, and illustrating optical paths through the molded reflective relay, in accordance with some embodiments.

FIG. 5 shows an example of paths that the concurrent laser lights output by the optical engine 202 can take through the optical relay 210 for an embodiment in which the optical relay 210 is a molded reflective relay. As shown, the optical engine 202 outputs red laser light 218-1, green laser light 218-2, and blue laser light 218-3 toward the beam combiner 404. The beam combiner 404 combines individual beams of the laser light 218-1, 218-2, 218-3 into the laser light 218, and redirects the laser light 218 toward the mirror 408, which reflects the laser light 218 onto the first scan mirror 206. The first scan mirror 206 scans the laser light 218 along a first scanning dimension 502 into the optical relay 210. The optical relay 210 reflects the laser light 218 off of reflective surfaces 504, 506, 508, and 510, then outputs the laser light 218 toward the reflective surface 414 of the second scan mirror 208. The second scan mirror 208 then scans the laser light 218 across the incoupler 212 along a second scanning dimension 512, where the laser light 218 converges onto the incoupler 212 at most or all achievable scan angles of the first scan mirror 206. While, in the present example, the beam combiner 404 is shown to output a single beam of the laser light 218, it should be understood that, in some embodiments, the beam combiner 404 is configured to output two or more angularly separated laser light beams, which are directed onto the first scan mirror 206.

Figure 6:
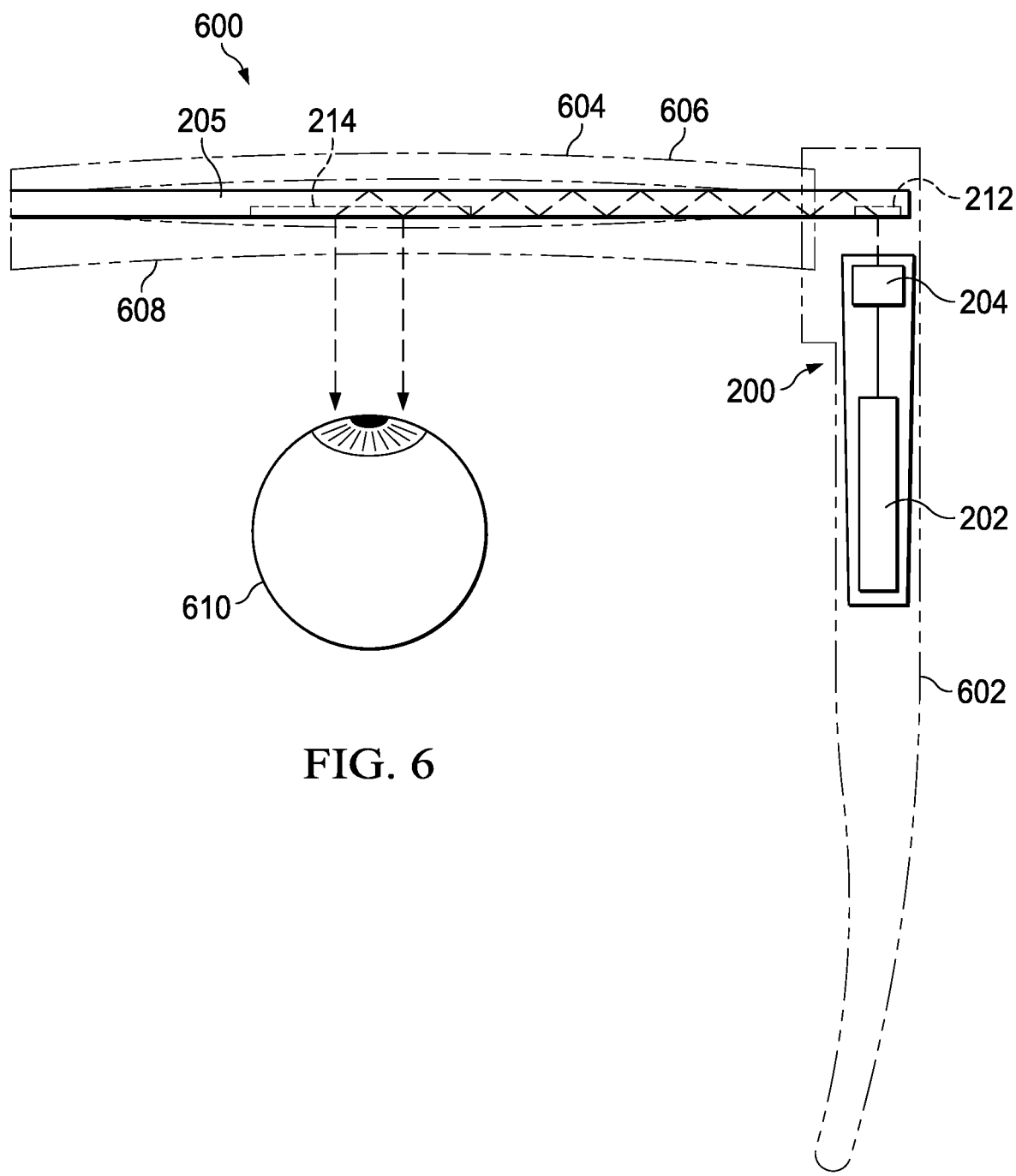
FIG. 6 is a diagram illustrating a partially transparent view of a wearable heads-up display (WHUD) that includes a laser projection system, in accordance with some embodiments.

FIG. 6 illustrates a portion of a WHUD 600 that includes the laser projection system 200 of FIG. 2. In some embodiments, the WHUD 600 represents the display system 100 of FIG. 1. The optical engine 202, the optical scanner 204, the incoupler 212, and a portion of the waveguide 205 are included in an arm 602 of the WHUD 600, in the present example.

The WHUD 600 includes an optical combiner lens 604, which includes a first lens 606, a second lens 608, and the waveguide 205, with the waveguide 205 disposed between the first lens 606 and the second lens 608. Light exiting through the outcoupler 214 travels through the second lens 608 (which corresponds to, for example, the lens element 110 of the display system 100). In use, the light exiting the second lens 608 enters the pupil of an eye 610 of a user wearing the WHUD 600, causing the user to perceive a displayed image carried by the laser light output by the optical engine 202. The optical combiner lens 604 is substantially transparent, such that light from real-world scenes corresponding to the environment around the WHUD 600 passes through the first lens 606, the second lens 608, and the waveguide 205 to the eye 610 of the user. In this way, images or other graphical content output by the laser projection system 200 are combined (e.g., overlayed) with real-world images of the user's environment when projected onto the eye 610 of the user to provide an AR experience to the user.

Although not shown in the depicted example, in some embodiments additional optical elements are included in any of the optical paths between the optical engine 202 and the incoupler 212, in between the incoupler 212 and the outcoupler 214, or in between the outcoupler 214 and the eye 610 of the user (e.g., in order to shape the laser light for viewing by the eye 610 of the user). As an example, a prism is used to steer light from the optical scanner 204 into the incoupler 212 so that light is coupled into incoupler 212 at the appropriate angle to encourage propagation of the light in waveguide 205 by TIR. Also, in some embodiments, an exit pupil expander (e.g., the exit pupil expander 304), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 610 of the user).

Figure 7:
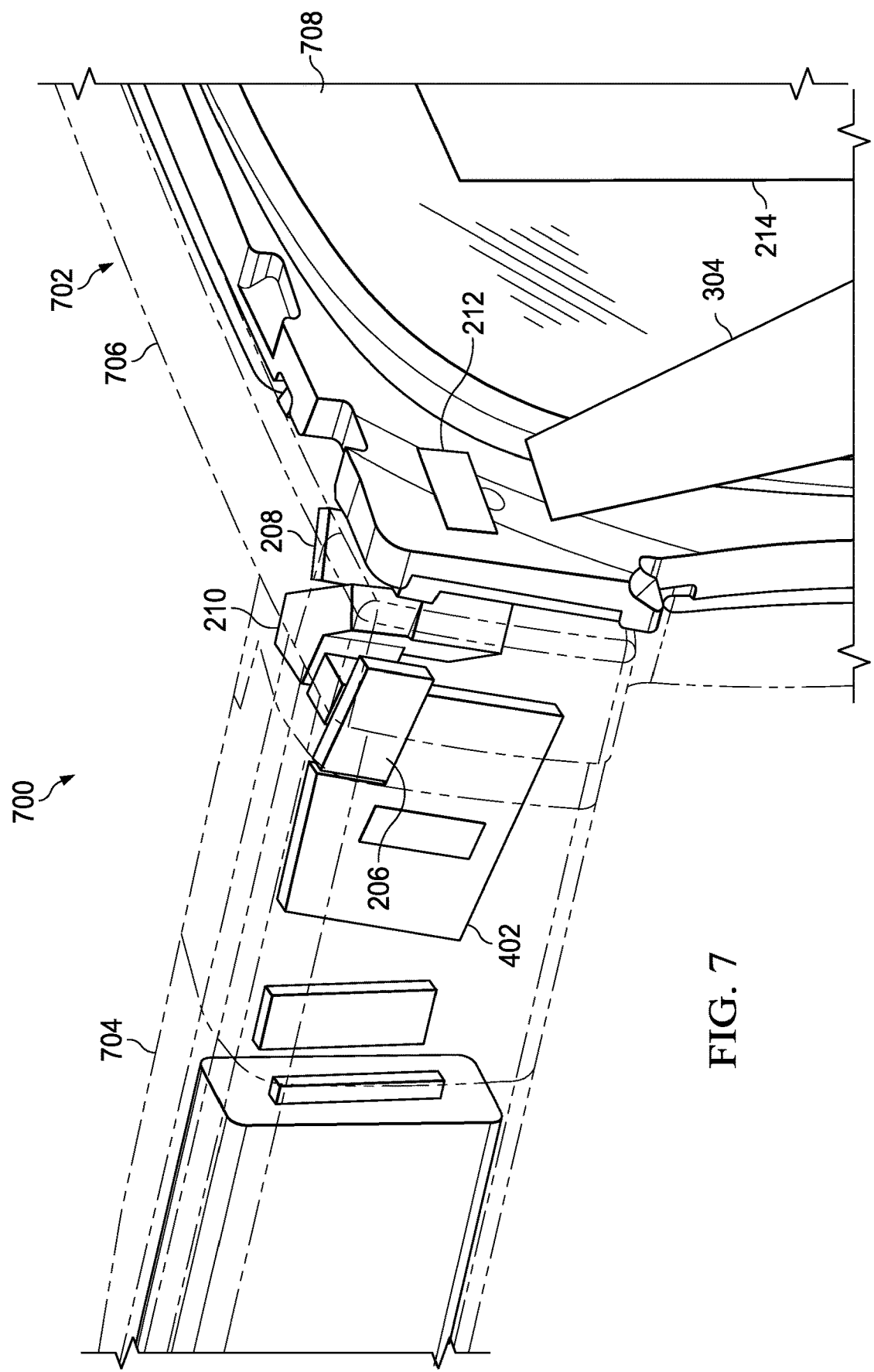
FIG. 7 is a diagram illustrating a partially transparent front isometric view of a laser projection system disposed within a WHUD, in accordance with some embodiments.
Figure 8:
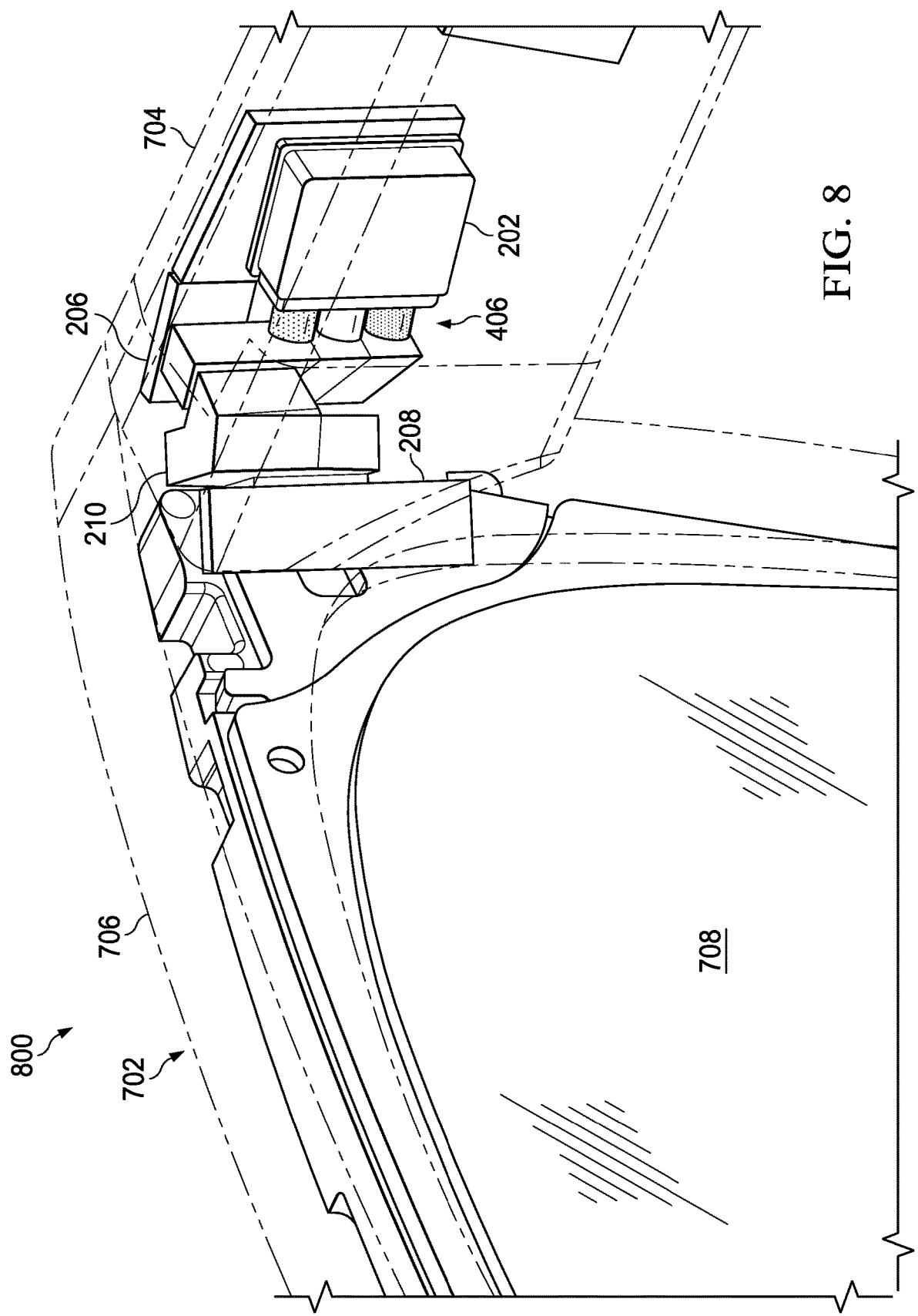
FIG. 8 is a diagram illustrating a partially transparent rear isometric view of a laser projection system disposed within a WHUD, in accordance with some embodiments.

FIGS. 7 and 8 show two different perspective, partially transparent views 700 (FIG. 7) and 800 (FIG. 8) of a portion of a WHUD 702, which represents the WHUD 600 of FIG. 6 or the display system 100 of FIG. 1. The WHUD 702 includes an example arrangement of the laser projection system 200 of FIGS. 2, 4, and 5 for an embodiment in which the optical relay 210 is a molded reflective relay. In some embodiments, the WHUD 702 corresponds to the display system 100 of FIG. 1, and the illustrated portion of the WHUD 702 corresponds to the region 112 of the display system 100.

As shown by the views 700 of FIG. 7 and 800 of FIG. 8, the arm 704 of the WHUD 702 houses the optical engine 202, the primary lenses 406 and at least a portion of the first scan mirror 206, the optical relay 210, and the substrate 402. A frame section 706 of the WHUD 702 houses the second scan mirror 208 and portions of the first scan mirror 206, the optical relay 210, and the substrate 402. As shown by the view 700 of FIG. 7, the incoupler 212 and the outcoupler 214 of the waveguide 205 (not fully shown in the views of FIGS. 7 and 8), are each embedded in or otherwise disposed on the lens 708 (one embodiment of, for example, lens 110 of FIG. 1). As described previously, laser light output by the optical engine 202 (e.g., laser light 218, FIG. 5) is routed to the incoupler 212 via at least the first scan mirror 206, the optical relay 210, and the second scan mirror 208. The first scan mirror 206 oscillates or otherwise rotates to scan the laser light along a first scanning dimension, and the second scan mirror 208 oscillates or otherwise rotates to scan the laser light along a second scanning dimension that is perpendicular to the first scanning dimension. Laser light reflected by the second scan mirror 208 converges to a line at the incoupler 212. Relayed laser light received at the incoupler 212 is routed to the outcoupler 214 via the waveguide 205. The laser light received at the outcoupler 214 is then directed out of the waveguide 205 (e.g., toward the eye of a user of the WHUD 702).

Figure 9:
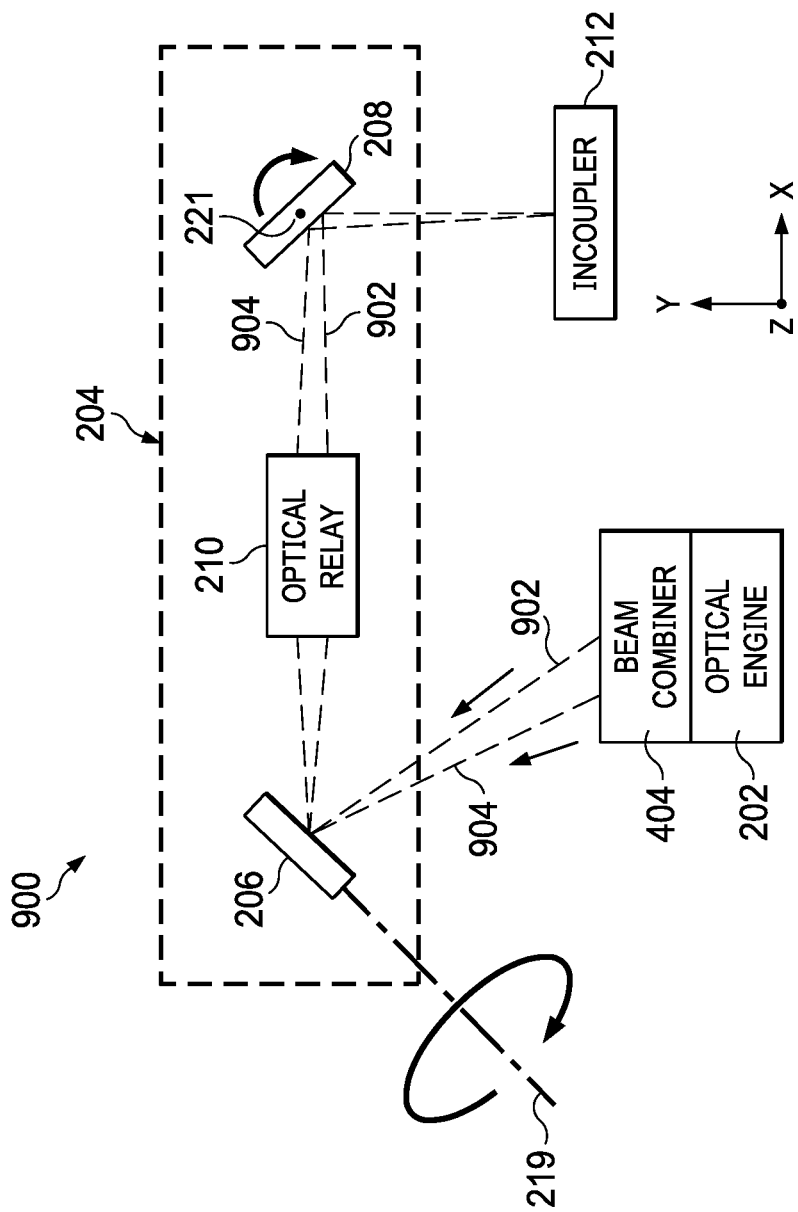
FIG. 9 is a diagram illustrating a top view of a portion of a laser projection system in which a pair of angularly separated lasers are routed via an optical scanner to be incident upon an incoupler, in accordance with some embodiments.

FIG. 9 shows an illustrative perspective view of a laser projection system 900 (one embodiment of the laser projection system 200 of FIG. 2), in which two angularly separated laser light beams are used to carry image information for projection. In the present example, In the present example, the perspective view of the laser projection system 900 is provided with respect to a three-dimensional cartesian coordinate system having respectively orthogonal x-, y-, and z-axes, where the perspective view provides the perspective of looking down the positive z-axis.

The optical engine 202 includes two or more laser light sources, each configured to output a respectively different wavelength of laser light toward the beam combiner 404. The beam combiner 404 combines the wavelengths of laser light output by the optical engine 202 into a first laser light beam 902 and a second laser light beam 904, which are angularly separated from one another (e.g., by an angle of between about 0 to about 10 degrees), and outputs the first and second laser light beams 902 and 904 (sometimes referred to herein as first and second angularly separated laser light beams 902 and 904) toward the first scan mirror 206. In some embodiments, each of the first laser light beam 902 and the second laser light beam 904 are considered "aggregate" laser light beams, as they each include multiple wavelengths of laser light that are combined via the beam combiner 404. In the present example, only the central rays of the first and second laser light beams 902 and 904 are shown, though it should be understood that the first and second laser light beams 902 and 904 are scanned over respective scan regions by the first and second scan mirrors 206 and 208, with the depicted central rays being centered within the scan regions. The first and second laser light beams 902 and 904 converge along the x-y dimension (with respect to the illustrated axes) to overlap (e.g., overlap with respect to the z dimension; having the same or substantially the same z-coordinates at the point or points of overlap) at a reflective surface (e.g., reflective surface 412 of FIG. 4) of the first scan mirror 206, the point of overlap corresponding to a first entrance pupil plane of the optical relay 210. According to various embodiments, other entrance pupil planes corresponding to a convergence of the first and second laser light beams 902 and 904 to virtual apertures along other dimensions or planes (e.g., dimensions or planes that are substantially perpendicular to the x-y dimension) may be disposed at the same or substantially the same location along the optical paths of the first and second laser light beams 902 and 904 as the first entrance pupil plane, or may instead be disposed at other locations along those optical paths. In some embodiments, the first axis 219 about which the first scan mirror 206 is configured to oscillate is aligned or substantially aligned along the x-y dimension and is perpendicular or substantially perpendicular to the z-axis.

The first scan mirror 206 scans the first and second laser light beams 902 and 904 into the optical relay 210 along a first scanning dimension (e.g., the scanning dimension 302 of FIG. 3; the first scanning dimension 502 of FIG. 5) that corresponds or substantially corresponds to the x-z dimension, which is substantially orthogonal to the x-y dimension. Upon reflection by the first scan mirror 206, the optical paths of the first and second laser light beams 902 and 904 again diverge, becoming angularly separated along the x-y dimension. In some embodiments, the optical relay 210 magnifies each of the first and second laser light beams 902 and 904 along one or more dimensions (e.g., to circularize each of the first and second laser light beams 902 and 904). According to various embodiments, respectively different levels (i.e., magnitudes) of magnification (sometimes referred to as beam expansion) of the first and second laser light beams 902 and 904 along their respective non-scanning dimensions are applied by the reflective surfaces of the optical relay 210. Herein, two dimensions (e.g., lines, planes, directions, or the like) are considered "substantially orthogonal" or "substantially perpendicular" to one another when they are within about 15 degrees of orthogonality or perpendicularity with respect to one another. The optical relay 210 relays the first and second laser light beams 902 and 904 toward the second scan mirror 208, causes the first and second laser light beams 902 and 904 to converge along the x-y dimension, and causes the scan region for each of the first and second laser light beams 902 and 904 to converge with respect to the z dimension along respective directions of propagation.

In the present example, first and second laser light beams 902 and 904 are incident on two respectively separate locations of the reflective surface (e.g., reflective surface 414 of FIG. 4) of the second scan mirror 208 (that is, an exit pupil plane of the optical relay along the x-y dimension is not disposed at the second scan mirror 208). However it should be understood that, in some embodiments, the first and second laser light beams 902 and 904 are instead incident upon the reflective surface of the second scan mirror 208 at substantially the same, or at least partially overlapping, areas of the reflective surface of the second scan mirror 208, with the reflective surface of the second scan mirror 208 acting as the exit pupil plane of the optical relay 210 along the x-y dimension in some such embodiments. Herein, two areas (e.g., the area of a region of incidence and the area of a reflective surface, the areas of two regions of incidence, etc.) are considered "substantially the same" if a first area of the two areas is within about 66% to about 133% of the size of the second area of the two areas. The second scan mirror 208 scans the first and second laser light beams 902 and 904 along the x-y dimension (e.g., the second scanning dimension 512 of FIG. 5) toward the incoupler 212.

In the present example, upon being reflected by the second scan mirror 208, the first and second laser light beams 902 and 904 converge along the x-y dimension to overlap (e.g., overlap with respect to the z dimension) at a first exit pupil plane of the optical relay 210 at the incoupler 212. However, for embodiments in which the exit pupil plane of the optical relay 210 is disposed at or substantially at the reflective surface of the second scan mirror 208, the first and second laser light beams 902 and 904 instead diverge along the x-y dimension after being reflected by the second scan mirror 208, and are incident at respectively different locations along the incoupler 212. According to various embodiments, other exit pupil planes corresponding to a convergence of the first and second laser light beams 902 and 904 to virtual apertures along other dimensions or planes (e.g., dimensions or planes that are substantially perpendicular to the x-y dimension, such as the z dimension) may be disposed at the same or substantially the same location along the optical paths of the first and second laser light beams 902 and 904 as the first exit pupil plane, or may instead be disposed at other locations along those optical paths. Additionally, the respective scan regions of the first and second laser light beams 902 and 904 each converge with respect to the z dimension along their respective directions of propagation, such that the second scan mirror 208 scans each of the first and second laser light beams 902 and 904 along respective substantially one-dimensional paths (e.g., in a respective line or arc) at the incoupler 212 (e.g., at the first exit pupil plane 908). Herein, a "substantially one-dimensional" path refers to a path that follows a single straight line or curved line (e.g., arc).

While in the present example of FIG. 9, the first and second laser light beams 902 and 904 that are input to the optical scanner 204 are shown to be angularly separated and converge along the x-y axis at the first entrance pupil plane at the first scan mirror 206 and the first exit pupil plane at the incoupler 212, in some alternative embodiments of the laser projection system 900, the first and second laser light beams 902 and 904 are not angularly separated by a substantially non-zero amount and are instead parallel or collinear. In such alternative embodiments, each of the first and second laser light beams 902 and 904 undergo independent convergence (i.e., of the light of each individual beam, not necessarily with respect to the other beam) to virtual apertures along the x-y axis at the first entrance pupil plane and at the first exit pupil plane.

Figure 10:
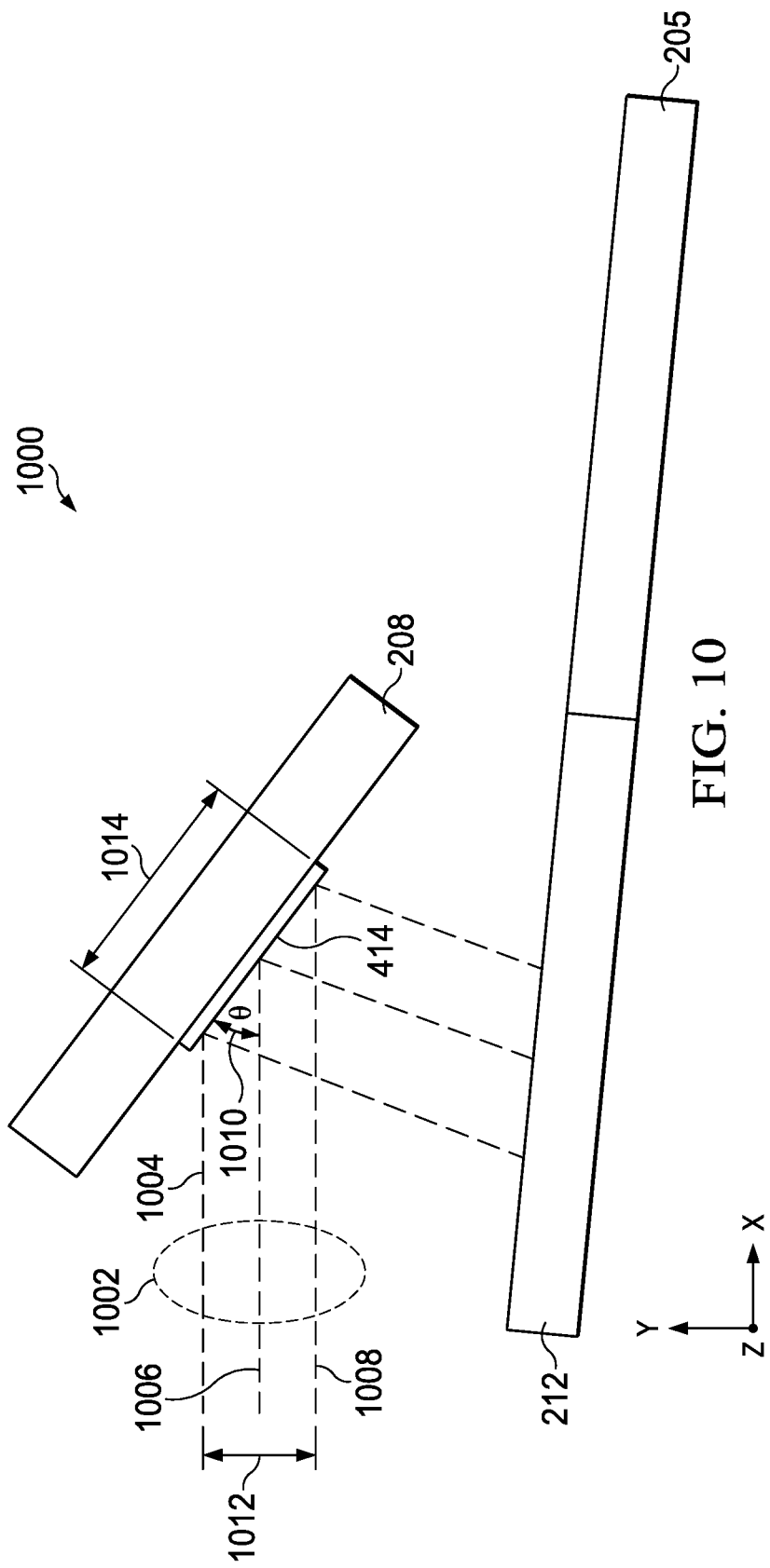
FIG. 10 is a diagram illustrating a top view of a portion of a laser projection system in which a laser light beam is incident at a reflective surface of the second scan mirror, in accordance with some embodiments.

FIG. 10 shows an illustrative perspective view 1000 of a portion of a laser projection system (one embodiment of the laser projection system 200 of FIG. 2), in which a laser light beam 1002 (sometimes referred to herein as a "first laser light beam 1002") is incident on the reflective surface 414 of the second scan mirror 208 with an angle of incidence 1010, denoted here as θ, with respect to a plane along which the reflective surface 414 is oriented (sometimes referred to herein as the plane of the reflective surface 414). In the present example, the first laser light beam 1002 has a beam diameter 1012 and angle of incidence 1010 such that the region of incidence of the first laser light beam 1002 on the second scan mirror 208 falls entirely within a boundary defined by the reflective surface 414. That is, all or substantially all of the first laser light beam 1002 is incident on the reflective surface 414. In some embodiments, the first laser light beam 1002 is an aggregate laser light beam that includes multiple wavelengths of laser light having been previously combined using, for example, a beam combiner (e.g., an embodiment of the beam combiner 404 of FIGS. 4, 9).

In the present example, the optical path of the first laser light beam 1002 is illustrated via a central ray 1006, a first boundary ray 1004, and a second boundary ray 1008. For example, the light of the first laser light beam 1002 is substantially or entirely disposed within the region defined by the first boundary ray 1004 and the second boundary ray 1008 and is centered, or substantially centered, along the central ray 1006. The shortest distance between the first boundary ray 1004 and the second boundary ray 1008 defines the beam diameter 1012.

As shown, the second scan mirror 208 includes a reflective surface 414 having a width 1014. The angle of incidence 1010 of the first laser light beam 1002 on the reflective surface 414 is defined here, with respect to an x-y plane, as the angle θ between the plane of the reflective surface 414 and the central ray 1006 of the first laser light beam 1002 as the first laser light beam 1002 approaches the reflective surface 414. The beam diameter 1012, the angle of incidence 1010, and the width 1014 of the reflective surface 414 collectively determine whether the region of incidence of the first laser light beam 1002 on the second scan mirror 208 is located entirely on the reflective surface 414, or if a portion the region of incidence misses the reflective surface. In some embodiments, the beam diameter 1012 of the first laser light beam 1002 is set via magnification of the first laser light beam 1002 applied at the optical relay 210 (e.g., via one or more reflective surfaces thereof having an optical prescription that results in such magnification).

While the second scan mirror 208 is shown here in a particular orientation (i.e., a first orientation), it should be understood that the reflective surface 414 of the second scan mirror 208 oscillates or otherwise rotates (for example, about an axis in the z-dimension, such as the second axis 221 shown in FIG. 2). In some embodiments, the reflective surface 414 oscillates or otherwise rotates independently from a body portion of the second scan mirror 208, while in other embodiments, the reflective surface 414 oscillates or otherwise rotates together with all or a portion of the body portion of the second scan mirror 208. Such rotation of the reflective surface 414 will typically cause the size of the region of incidence of the first laser light beam 1002 on the reflective surface 414 to change due to resultant changes in the angle of incidence 1010 (for example, with the region of incidence decreasing in size as the angle of incidence 1010 approaches being normal to the reflective surface 414 and increasing as the angle of incidence 1010 approaches being parallel to the reflective surface 414). In some embodiments, the beam diameter 1012 of the first laser light beam 1002 is set such that the region of incidence of the first laser light beam 1002 on the second scan mirror 208 is disposed substantially (with at least about 80% of the first laser light beam 1002 being incident on the reflective surface 414, for example) or entirely on the reflective surface 414, throughout each period of oscillation or rotation of the reflective surface 414. That is, the first laser light beam 1002 remains substantially or entirely incident on the reflective surface 414, even when the reflective surface is at its rotational or oscillatory extrema during operation. Here, the furthest extent to which a scan mirror rotates or oscillates in a given direction during operation is referred to as its rotational or oscillatory extrema in that direction.

Figure 11:
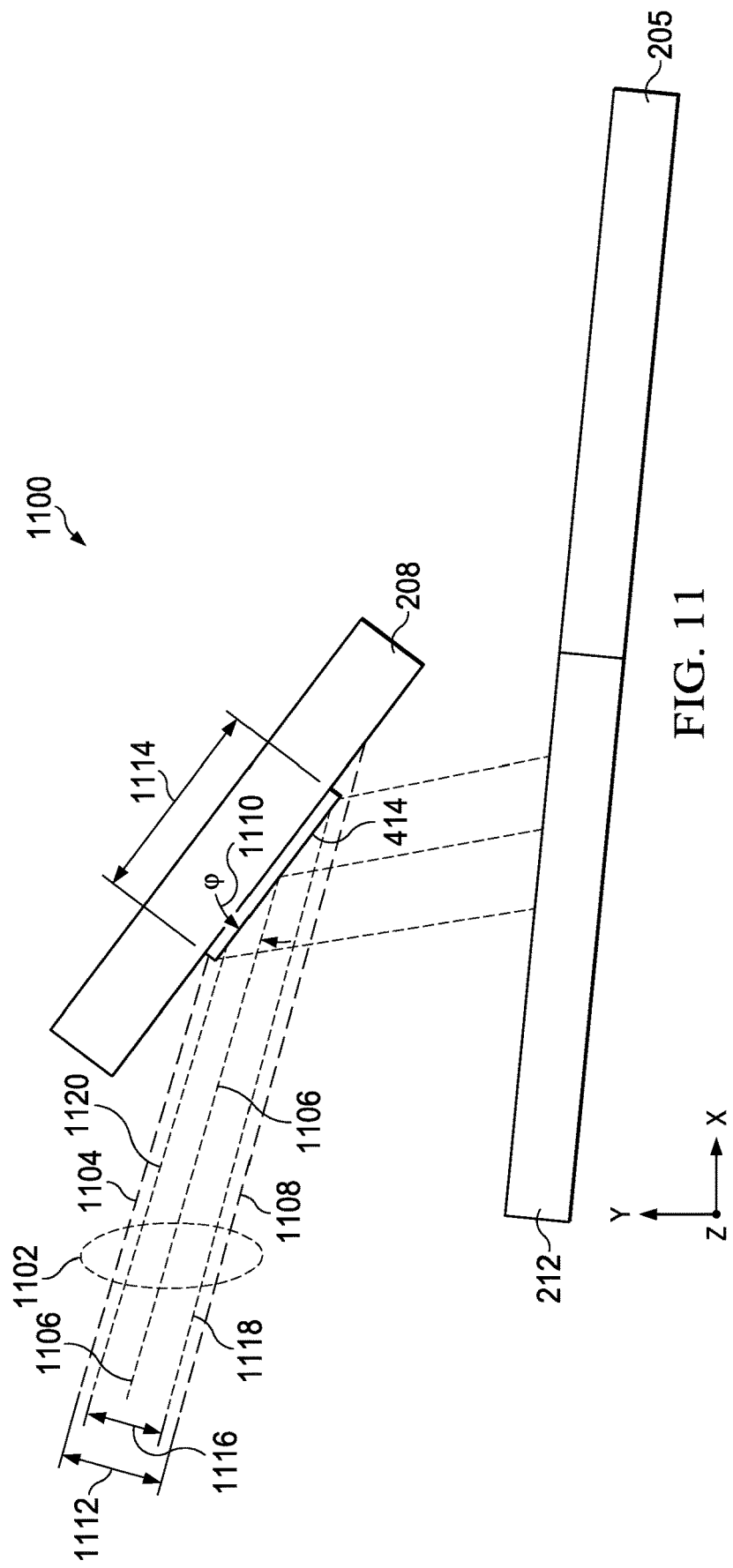
FIG. 11 is a diagram illustrating a top view of a portion of a laser projection system in which a laser light beam is incident at the reflective surface of the second scan mirror at an angle that can result in a portion of the laser light beam missing the reflective surface depending on the beam diameter of the laser light beam, in accordance with some embodiments.

FIG. 11 shows an illustrative perspective view 1100 of a portion of a laser projection system (one embodiment of the laser projection system 200 of FIG. 2), in which a laser light beam 1102 is incident (sometimes referred to herein as a "second laser light beam 1102") on the reflective surface 414 of the second scan mirror 208 at an angle of incidence 1110, denoted here as φ, with respect to the plane along which the reflective surface 414 is oriented. In some embodiments, the second laser light beam 1102 is an aggregate laser light beam that includes multiple wavelengths of laser light having been previously combined using, for example, a beam combiner (e.g., an embodiment of the beam combiner 404 of FIGS. 4, 9).

According to various embodiments, the first laser light beam 1002 of FIG. 10 and the second laser light beam 1102 may be provided to the second scan mirror 208 together as angularly separated laser light beams. In some embodiments, the angle of incidence 1110 of the second laser light beam 1102 is further from normal to the plane of the reflective surface 414 compared to the angle of incidence 1010 of the first laser light beam 1002, resulting in a larger region of incidence of the second laser light beam 1102 on the second scan mirror 208 compared to the region of incidence of the first laser light beam 1002 on the second scan mirror 208 for instances in which the second laser light beam 1102 and the first laser light beam 1002 have the same or similar respective beam diameters.

In a first example, the second laser light beam 1102 has a beam diameter 1112 such that, given the angle of incidence 1110, the region of incidence of the second laser light beam 1102 on the second scan mirror 208 partially exceeds a boundary defined by the reflective surface 414. That is, in the first example, a portion of the second laser light beam 1102 misses (and is therefore not reflected by) the reflective surface 414, resulting in a reduction in brightness of images generated by the laser projection system. In some embodiments of the first example, the beam diameter 1112 of the second laser light beam 1102 is the same as or substantially the same as the beam diameter 1012 of the first laser light beam 1002. In some embodiments of the first example, the beam diameter 1116 is set via magnification of the second laser light beam 1102 applied by reflective surfaces of the optical relay 210.

In the first example, the optical path of the second laser light beam 1102 is illustrated via a central ray 1106, a first boundary ray 1104, and a second boundary ray 1108. The light of the second laser light beam 1102 is substantially or entirely disposed within the region defined by the first boundary ray 1104 and the second boundary ray 1108 and is centered, or substantially centered, along the central ray 1106. The shortest distance between the first boundary ray 1104 and the second boundary ray 1108 defines the beam diameter 1112. As shown, portions of light of the second laser light beam 1102 near the boundary rays 1104 and 1108 miss the reflective surface 414, due to the region of incidence of the second laser light beam 1102 exceeding the width 1114 of the reflective surface 414.

In a second example, the second laser light beam 1102 has a beam diameter 1116 that is smaller than the beam diameter 1112 of the first example, such that, in view of the angle of incidence 1110, the region of incidence of the second laser light beam 1102 on the second scan mirror 208 falls entirely within the boundary defined by the reflective surface 414. That is, in the second example, all or substantially all of the second laser light beam 1102 is incident on the reflective surface 414. In some embodiments of the second example, the beam diameter 1116 of the second laser light beam 1102 is smaller than the beam diameter 1012 of the first laser light beam 1002.

In some embodiments of the second example, the first laser light beam 1002 and the second laser light beam 1102 are initially generated with matching or substantially matching beam diameters, and different respective levels of magnification are applied to each of the first laser light beam 1102 and the second laser light beam 1102 by the reflective surfaces of the optical relay 210, resulting in the second laser light beam 1102 having a beam diameter 1116 that is smaller than the beam diameter 1012 of the first laser light beam 1002. In some embodiments of the second example, the beam diameter 1116 is set via magnification of the second laser light beam 1102 applied by reflective surfaces of the optical relay 210 such that the respective regions of incidence of the first laser light beam 1002 and the second laser light beam 1102 are the same size or substantially the same size. By applying different respective levels of magnification to the first laser light beam 1002 and the second laser light beam 1102 in this way, the beam diameter of the second laser light beam 1102 can be made smaller than that of the first laser light beam 1002 to account for the difference in the angles of incidence 1010 and 1110 and corresponding difference in regions of incidence of the first and second laser light beams 1002 and 1102 on the second scan mirror 208, even in instances where the first laser light beam 1002 and the second laser light beam 1102 are initially generated with the same or substantially similar beam diameters.

In the second example, the optical path of the second laser light beam 1102 is illustrated via the central ray 1106, a third boundary ray 1118, and a fourth boundary ray 1120. The light of the second laser light beam 1102 is substantially or entirely disposed within the region defined by the third boundary ray 1118 and the fourth boundary ray 1120 and is centered, or substantially centered, along the central ray 1106. The shortest distance between the third boundary ray 1118 and the fourth boundary ray 1120 defines the beam diameter 1116. As shown, all or substantially all of the second laser light beam 1102 is incident on the reflective surface 414 when the second laser light beam 1102 has the beam diameter 1116.

In both the first and second examples, the angle of incidence 1110 of the second laser light beam 1102 on the reflective surface 414 is defined, with respect to an x-y plane, as the angle φ between the plane of the reflective surface 414 and the central ray 1106 of the second laser light beam 1102 as the second laser light beam 1102 approaches the reflective surface 414. The beam diameters 1112 or 1116, the angle of incidence 1110, and the width 1114 of the reflective surface 414 collectively determine whether the region of incidence of the second laser light beam 1102 on the second scan mirror 208 is located entirely on the reflective surface 414, or if a portion the region of incidence misses the reflective surface.

It should be noted that the depicted orientation of the scan mirror 208 is intended to correspond to the orientation of the scan mirror 208 shown in FIG. 10 (e.g., for ease of comparison between the respective angles of incidence 1010 and 1110). As described above, rotation of the reflective surface 414 will typically cause the size of the region of incidence of the second laser light beam 1102 on the reflective surface 414 to change due to resultant changes in the angle of incidence 1110 (e.g., with the region of incidence decreasing in size as the angle of incidence 1110 approaches being normal to the reflective surface 414 and increasing as the angle of incidence 1110 approaches being parallel to the reflective surface 414). In some embodiments, the beam diameter 1116 of the second laser light beam 1102 is set such that the region of incidence of the laser light beam 1102 on the second scan mirror 208 is disposed substantially (with 90% or more of the second laser light beam 1102 being incident on the reflective surface 414, for example) or entirely on the reflective surface 414, throughout each period of oscillation or rotation of the reflective surface 414. That is, the second laser light beam 1102 remains substantially or entirely incident on the reflective surface 414, even when the reflective surface is at its rotational or oscillatory extrema during operation.

Figure 12:
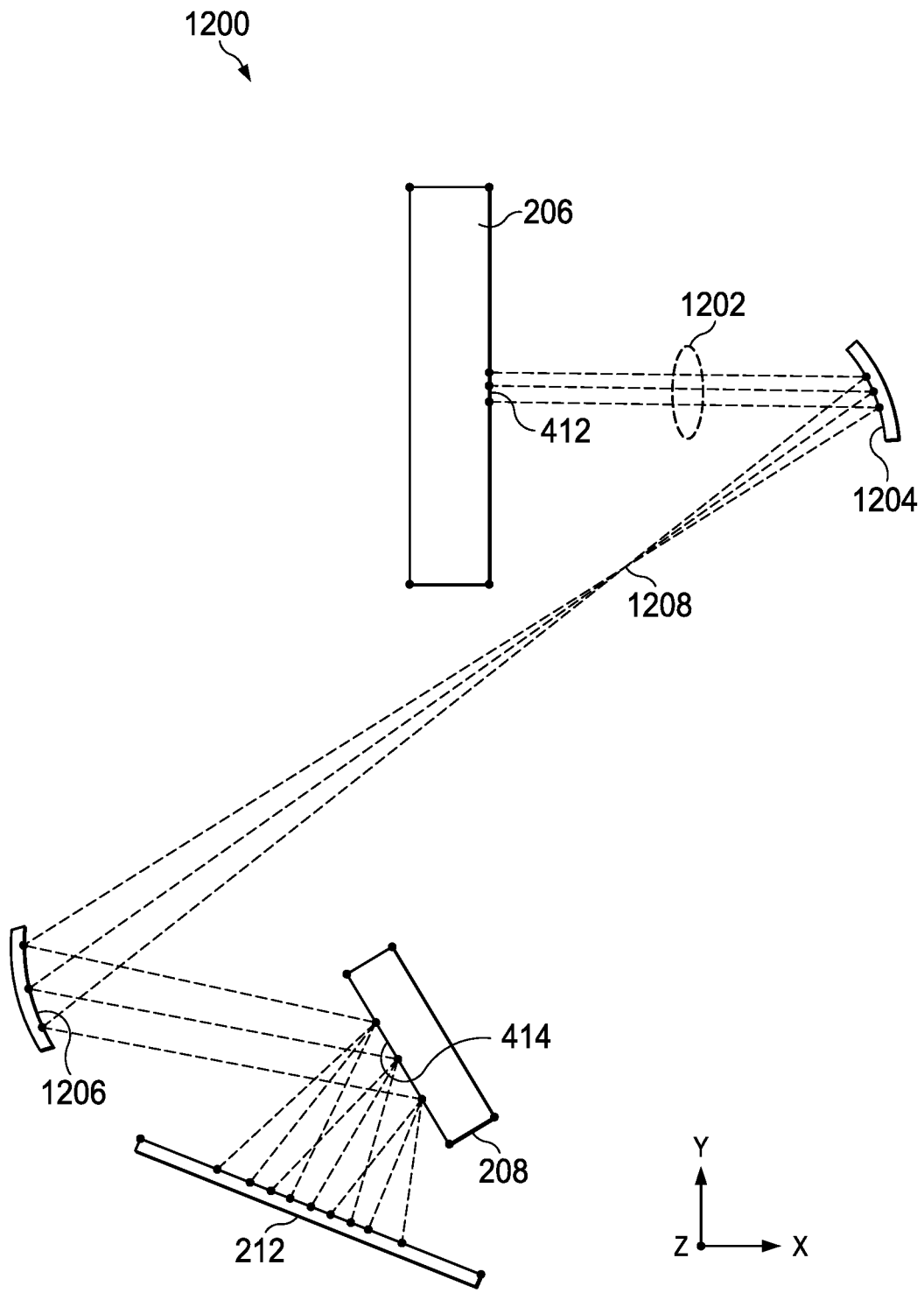
FIG. 12 is a diagram illustrating a top view of an optical scanner of a laser projection system in which a first magnitude of beam expansion is applied to a first laser light beam by first reflective surfaces of an optical relay, in accordance with some embodiments.

FIG. 12 shows an illustrative perspective view 1200 of a portion of a laser projection system (one embodiment of the laser projection system 200 of FIG. 2), in which a laser light beam 1202 (sometimes referred to herein as a "first laser light beam 1202"; one embodiment of the first laser light beam 1002 of FIG. 10), following reflection by the reflective surface 412 of the first scan mirror 206, travels along the illustrated optical path and is incident upon a first reflective surface 1204, then a second reflective surface 1206, and then the reflective surface 414 of the second scan mirror 208, which scans first laser light beam 1202 along a path (e.g., a line or arc) at the incoupler 212. The first reflective surface 1204 and the second reflective surface 1206 are, for example, reflective surfaces of an optical relay, such as an embodiment of the optical relay 210 of any of FIGS. 2, 4, 5, 7, 8, and 9.

The first reflective surface 1204 is configured to focus the first laser light beam 1202 to an intermediate pupil plane 1208 with respect to the x-y dimension, after which beam width of the first laser light beam 1202 expands with respect to the x-y dimension until it strikes the second reflective surface 1206. The second reflective surface 1206 collimates the first laser light beam 1202 and reflects the first laser light beam 1202 toward the second scan mirror 208. According to various embodiments, either or both of the first reflective surface 1204 and the second reflective surface 1206 have optical prescriptions that effectively magnify the first laser light beam 1202. That is, the magnification introduced by either or both of the first reflective surface 1204 and the second reflective surface 1206 cause the first laser light beam 1202 to have a larger beam diameter in a first dimension after being reflected by the second reflective surface 1206, compared to the beam diameter in the first dimension of the first laser light beam 1202 between the first scan mirror 206 and the first reflective surface 1204. Here, the beam diameter of the first laser light beam 1202 in the "first dimension" refers to the diameter of the first laser light beam 1202 along the x-y dimension or along a dimension that is substantially perpendicular to the scanning dimension of the first scan mirror 206. The magnitude of the magnification applied to beam diameter of the first laser light beam 1202 in the first dimension by either or both of the first reflective surface 1204 and the second reflective surface 1206 is sometimes referred to herein as a "first magnification level".

Figure 13:
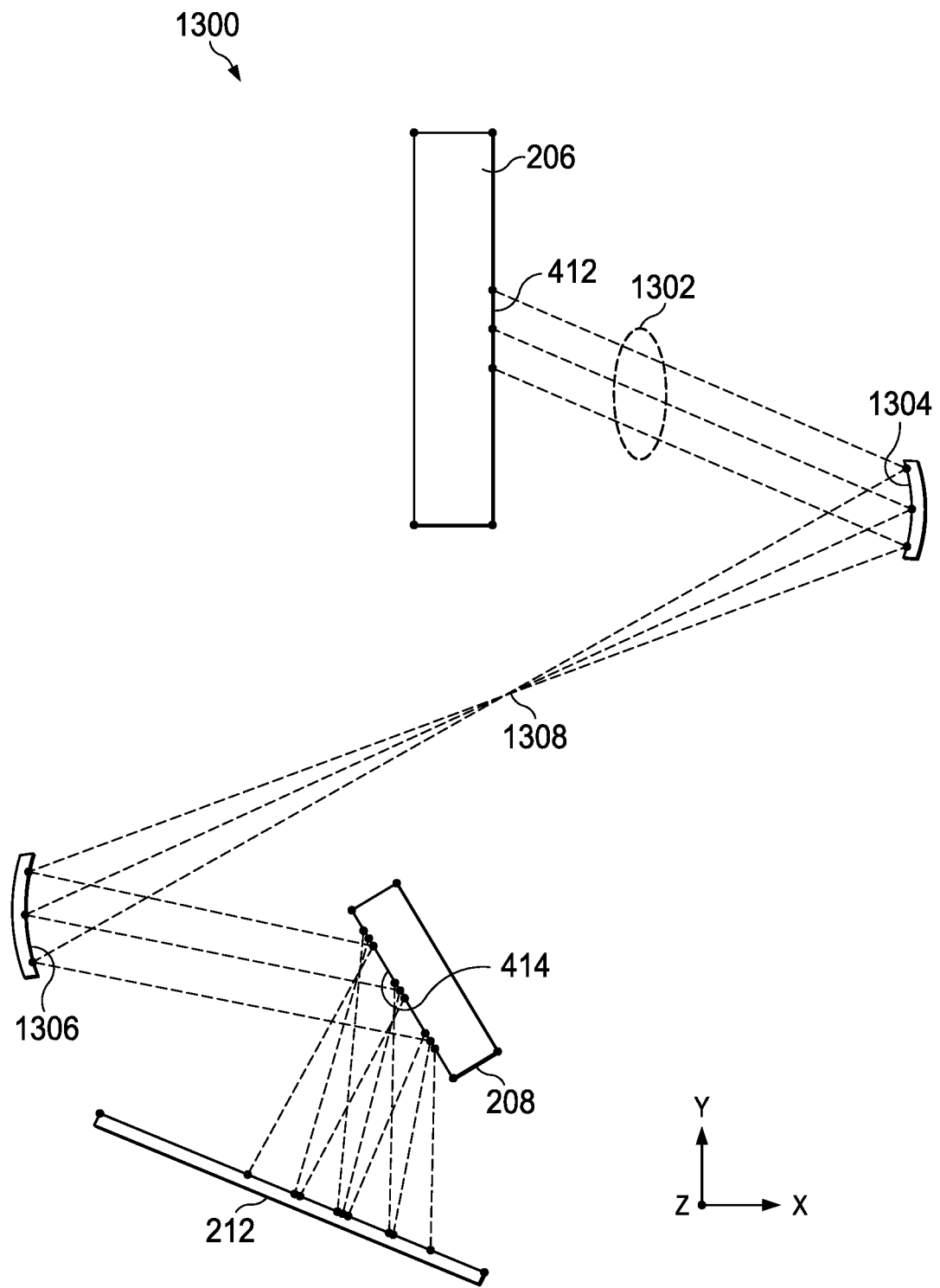
FIG. 13 is a diagram illustrating a top view of an optical scanner of a laser projection system in which a second magnitude of beam expansion is applied to a second laser light beam by second reflective surfaces of an optical relay, in accordance with some embodiments.

FIG. 13 shows an illustrative perspective view 1300 of a portion of a laser projection system (one embodiment of the laser projection system 200 of FIG. 2), in which a laser light beam 1302 (sometimes referred to herein as a "second laser light beam 1302"; one embodiment of the second laser light beam 1102 of FIG. 11), following reflection by the reflective surface 412 of the first scan mirror 206, travels along the illustrated optical path and is incident upon a third reflective surface 1304, then a fourth reflective surface 1306, and then the reflective surface 414 of the second scan mirror 208, which scans the second laser light beam 1302 along a path (e.g., a line or arc) at the incoupler 212. The third reflective surface 1304 and the fourth reflective surface 1306 are, for example, reflective surfaces of an optical relay, such as an embodiment of the optical relay 210 of any of FIGS. 2, 4, 5, 7, 8, and 9.

The third reflective surface 1304 is configured to focus the second laser light beam 1302 to an intermediate pupil plane 1308 with respect to the x-y dimension, after which beam width of the second laser light beam 1302 expands with respect to the x-y dimension until it strikes the fourth reflective surface 1306. The fourth reflective surface 1306 collimates the second laser light beam 1302 and reflects the second laser light beam 1302 toward the second scan mirror 208. According to various embodiments, either or both of the third reflective surface 1304 and the fourth reflective surface 1306 have optical prescriptions that effectively magnify the second laser light beam 1302. That is, the magnification introduced by either or both of the third reflective surface 1304 and the fourth reflective surface 1306 cause the second laser light beam 1302 to have a larger beam diameter in a first dimension after being reflected by the fourth reflective surface 1306, compared to the beam diameter in the first dimension of the second laser light beam 1302 between the first scan mirror 206 and the third reflective surface 1304. Here, the beam diameter of the second laser light beam 1302 in the "first dimension" refers to the diameter of the second laser light beam 1302 along the x-y dimension or along a dimension that is substantially perpendicular to the scanning dimension of the first scan mirror 206. The magnitude of the magnification applied to beam diameter of the second laser light beam 1302 in the first dimension by either or both of the third reflective surface 1304 and the fourth reflective surface 1306 is sometimes referred to herein as a "second magnification level".

Figure 14:
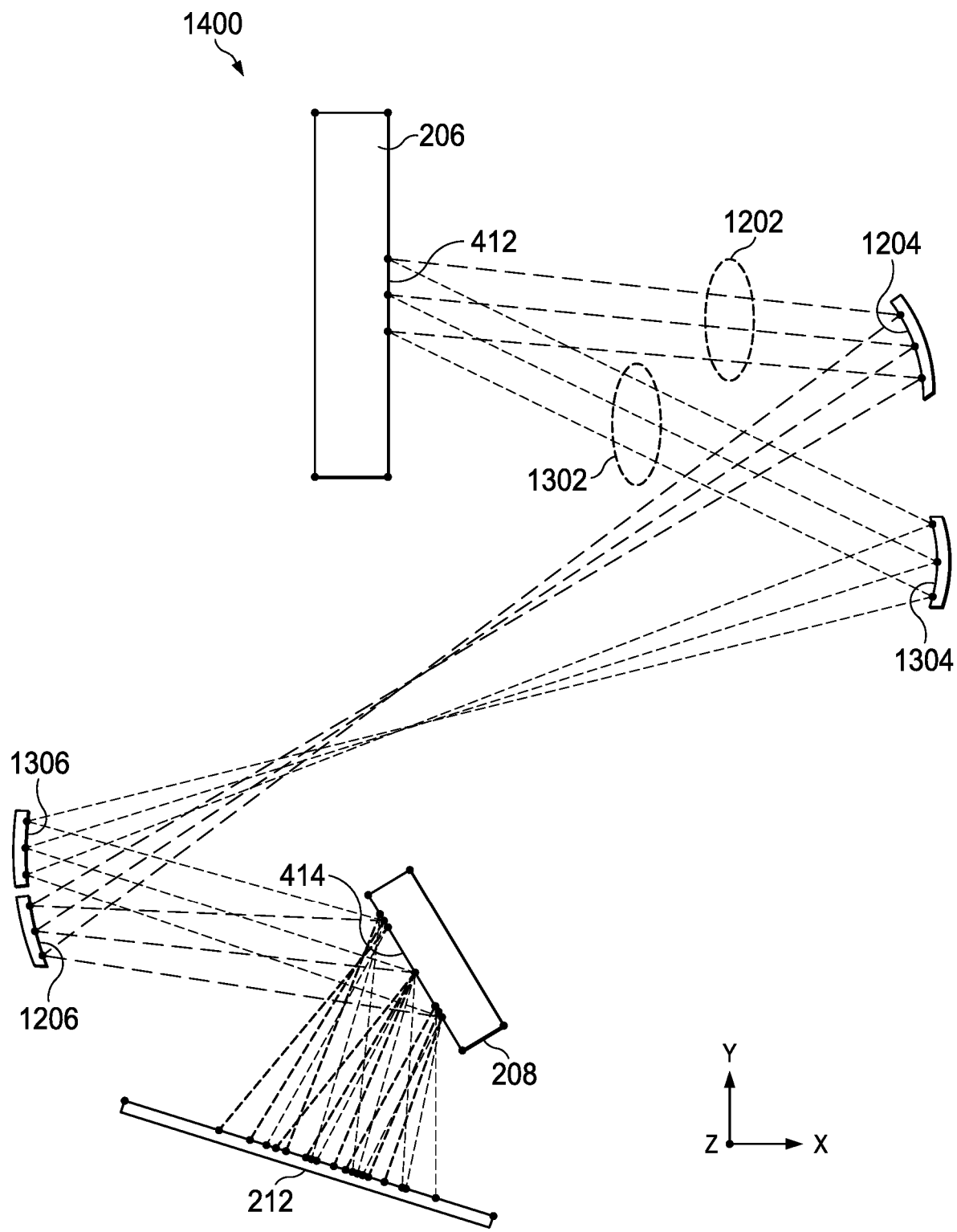
FIG. 14 is a diagram illustrating a top view of an optical scanner of a laser projection system that includes the first reflective surfaces of the example of FIG. 12 and the second reflective surfaces of the example of FIG. 13, which provide respectively different levels of magnification to angularly separated laser light beams, in accordance with some embodiments.

FIG. 14 shows an illustrative perspective view 1400 of a portion of a laser projection system (one embodiment of the laser projection system 200 of FIG. 2), which includes embodiments of the first laser light beam 1202 and the first and second reflective surfaces 1204 and 1206 of the example of FIG. 12 and the second laser light beam 1302 and the third and fourth reflective surfaces 1304 and 1306 of the example of FIG. 13. As shown in the present example, the first laser light beam 1202 and the second laser light beam 1302 are angularly separated with respect to one another. It should be noted that the respective optical paths of the first laser light beam 1202 and the second laser light beam 1302 cross at various points, as illustrated.

In the present example, an optical relay, such as an embodiment of the optical relay 210 of any of FIGS. 2, 4, 5, 7, 8, and 9, includes the reflective surfaces 1204, 1206, 1304, and 1306. In some embodiments, each of the reflective surfaces 1204, 1206, 1304, and 1306 are discrete reflective elements, such as mirrors, metasurfaces, and/or the like. In some embodiments, each of the reflective surfaces 1204, 1206, 1304, and 1306 are included as surfaces of a molded reflective relay (e.g., a monolithic molded reflective relay).

Due to the angular separation of the first laser light beam 1202 and the second laser light beam 1302, the first laser light beam 1202 has a first angle of incidence (e.g., the angle of incidence 1010 of FIG. 10) on the reflective surface 414 of the second scan mirror 208 that is different than a second angle of incidence (e.g., the angle of incidence 1110 of FIG. 10) of the second laser light beam 1302 on the reflective surface 414. In the present example, the first angle of incidence of the first laser light beam 1202 on the reflective surface 414 is closer to normal with respect to the plane of the reflective surface 414 than the second angle of incidence of the second laser light beam 1302, such that the region of incidence of the first laser light beam 1202 on the second scan mirror 208 would be smaller than the region of incidence of the second laser light beam 1302 if the first laser light beam 1202 and the second laser light beam 1302 were to have the same beam diameter upon incidence at the second scan mirror 208. In order to accommodate the difference in respective angles of incidence of the first laser light beam 1202 and the second laser light beam 1302 on the second scan mirror 208, while the first laser light beam 1202 and the second laser light beam 1302 initially have similar or matching beam diameters, as shown, a first level of magnification is applied to the beam diameter of the first laser light beam 1202 in a first dimension (i.e., the x-y dimension) by one or both of the first reflective surface 1204 and the second reflective surface 1206, while a second level of magnification is applied to the beam diameter of the second laser light beam 1302 in the first dimension by one or both of the third reflective surface 1304 and the fourth reflective surface 1306. For example, the first level of magnification is greater than the second level of magnification, such that the beam diameter of the first laser light beam 1202 in the first dimension (a beam diameter of about 1 mm, for example) is greater than the beam diameter of the second laser light beam 1202 in the first dimension (a beam diameter of about 0.9 mm, for example) when the first and second beams are incident on the second scan mirror 208. In some embodiments, the first and second levels of magnification applied to the respective beam diameters of the first laser light beam 1202 and the second laser light beam 1302 by the reflective surfaces 1204 and 1206 and the reflective surfaces 1304 and 1306, respectively, are set such that the respective regions of incidence of the first laser light beam 1202 and the second laser light beam 1302 at the second scan mirror 208 are of equal or substantially equal area, shape, or both and each fall entirely or substantially within the perimeter defined by the reflective surface 414 of the second scan mirror 208. By applying different levels of magnification in the first dimension to the respective beam diameters of the angularly separated first laser light beam 1202 and second laser light beam 1302 in this way, the otherwise larger region of incidence of the second laser light beam 1302 on the second scan mirror 208 can be accommodated without increasing the size of the reflective surface 414. This approach may be beneficial, for example, for laser projectors in which the size of the reflective surface (e.g., reflective surface 414) of the second scan mirror is a limiting factor, such that increasing the size of the reflective surface to accommodate a larger region of incidence of the wider-angled laser light beam (e.g., the second laser light beam 1302) of two angularly separated input laser light beams would be undesirable.

While the first laser light beam 1202 and the second laser light beam 1302 are shown in the present example to have respective initial beam diameters (the "initial beam diameters" herein referring to the beam diameters of the first and second laser light beams 1202 after reflection by the first scan mirror 206 and prior to reflection by the reflective surfaces 1204 and 1304) that are similar or the same, it should be understood that in some embodiments, the first laser light beam 1202 and the second laser light beam 1302 instead have different initial beam diameters, at least with respect to the first dimension. In some such embodiments, a first level of magnification applied by the reflective surfaces 1204 and 1206 to the first laser light beam 1202 differs from a second level of magnification applied by the reflective surfaces 1304 and 1306 to the second laser light beam 1302, where the first level of magnification is different from the second level of magnification. The first level of magnification and the second level of magnification may cause the beam diameters of the first laser light beam 1202 and second laser light beam 1302, after reflection by the reflective surfaces 1206 and 1306, to be sized to cause the respective regions of incidence of the first laser light beam 1202 and the second laser light beam 1302 on the second scan mirror 208 to be the same or substantially the same and, in some embodiments, to have respective shapes, areas, or both that are the same or substantially the same as those of the reflective surface 414 of the second scan mirror 208, given the respectively different angles of incidence of the first laser light beam 1202 and the second laser light beam 1302 on the second scan mirror 208.

In an alternate embodiment, each of the reflective surfaces 1204, 1206, 1304, and 1306 provide the same level of magnification to the first and second laser light beams 1202 and 1302, and the initial beam diameters of the first and second laser light beams 1202 and 1302 are selected to be respectively different (e.g., with respect to the first dimension), such that their regions of incidence on the second scan mirror 208 are the same or substantially the same and, in some embodiments, have the same area, shape, or both as those of the reflective surface 414 of the second scan mirror 208. That is, rather than applying different levels of magnification to the laser light beams 1202 and 1302, the laser light beams 1202 and 1302 are introduced to the optical relay with respectively different initial beam diameters, the same level of magnification is applied to each of the laser light beams 1202 and 1302 by the reflective surfaces 1204, 1206, 1304, and 1306, and the respectively different initial beam diameters of the laser light beams 1202 and 1302, given the respectively different angles of incidence of the laser light beams 1202 and 1302 on the second scan mirror 208, cause the respective regions of incidence of the first laser light beam 1202 and the second laser light beam 1302 to be the same or substantially the same and, in some embodiments, to have respective shapes, areas, or both that are the same or substantially the same as those of the reflective surface 414 of the second scan mirror 208.

Various embodiments described above are provided in the context of generating and routing laser light through an optical system. However, it should be understood that, in addition to or in place of such laser light and corresponding laser light sources, other applicable collimated light sources and corresponding light may be used in conjunction with the described embodiments.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A laser projection system comprising:
   an optical relay configured to receive and relay a first laser light beam and a second laser light beam and to apply respectively different levels of magnification to the first laser light beam and the second laser light beam to produce a first magnified laser light beam and a second magnified laser light beam, wherein the first laser light beam and the second laser light beam are angularly separated, the first magnified laser light beam and the second magnified laser light beam being scanned into the optical relay; and
   a first scan mirror configured to receive the magnified first laser light beam and the magnified second laser light beam from the optical relay.

2. The laser projection system of claim 1, further comprising:
   a second scan mirror configured to scan the first magnified laser light beam and the second magnified laser light beam into the optical relay.

3. The laser projection system of claim 1, the optical relay comprising:
   a first reflective surface configured to apply a first level of magnification to the first laser light beam; and
   a second reflective surface configured to apply a second level of magnification to the second laser light beam.

4. The laser projection system of claim 3, wherein the optical relay is a molded reflective relay, the first reflective surface is a first reflective surface of the molded reflective relay, and the second reflective surface is a second reflective surface of the molded reflective relay.

5. The laser projection system of claim 1, wherein the first magnified laser light beam has a first region of incidence upon the first scan mirror, the second magnified laser light beam has a second region of incidence up on the first scan mirror, and the first region of incidence is substantially similar the same in area to the second region of incidence.

6. The laser projection system of claim 5, wherein the first scan mirror is configured to receive the first magnified laser light beam with a first angle of incidence and to receive the second magnified laser light beam with a second angle of incidence, wherein the first angle of incidence is different from the second angle of incidence.

7. The laser projection system of claim 5, wherein the first region of incidence and the second region of incidence are each bound by a reflective surface of the first scan mirror.

8. A near-eye display comprising the laser projection system of claim 1, and further comprising:
   an eyeglasses frame that surrounds at least a portion of the laser projection system; and
   an eyeglasses lens, wherein the laser projection system is configured to output the first laser light beam and the second laser light beam through at least a portion of the eyeglasses lens.

9. A near-eye display comprising:
   a laser projection system comprising:
      an optical relay configured to receive angularly separated laser light beams, apply respectively different levels of magnification to the angularly separated laser light beams, and to relay the magnified angularly separated laser light beams; and
      a scan mirror configured to receive the magnified angularly separated laser light beams from the optical relay and to scan the magnified angularly separated laser light beams.

10. The near-eye display of claim 9, the angularly separated laser light beams comprising a first laser light beam and a second laser light beam, the optical relay comprising:
    a first reflective surface configured to apply a first level of magnification to the first laser light beam; and
    a second reflective surface configured to apply a second level of magnification to the second laser light beam.

11. The near-eye display of claim 10, wherein the optical relay is a molded reflective relay, the first reflective surface is a first reflective surface of the molded reflective relay, and the second reflective surface is a second reflective surface of the molded reflective relay.

12. The near-eye display of claim 10, wherein the first laser light beam has a first region of incidence upon the scan mirror, the second laser light beam has a second region of incidence up on the scan mirror, and the first region of incidence is substantially similar in area to the second region of incidence.

13. The near-eye display of claim 12, wherein the scan mirror is configured to receive the first laser light beam with a first angle of incidence and to receive the second laser light beam with a second angle of incidence, wherein the first angle of incidence is different from the second angle of incidence.

14. The near-eye display of claim 13, wherein the first level of magnification causes the first laser light beam to have a first beam diameter in a first dimension, the second level of magnification causes the second laser light beam to have a second beam diameter in the first dimension, the first region of incidence has a first area defined, at least in part, by the first beam diameter and the first angle of incidence, and the second region of incidence has a second area defined, at least in part, by the second beam diameter and the second angle of incidence.

15. The near-eye display of claim 12, wherein the first region of incidence and the second region of incidence are each bound by a reflective surface of the scan mirror.

16. A method comprising:
    receiving, with an optical relay, angularly separated laser light beams from a first scan mirror;
    applying, with the optical relay, respectively different levels of magnification to each of the angularly separated laser light beams to generate magnified angularly separated laser light beams; and
    relaying, with the optical relay, the magnified angularly separated laser light beams to a second scan mirror.

17. The method of claim 16, further comprising:
    receiving, with the second scan mirror, the magnified angularly separated laser light beams from the optical relay, wherein a first laser light beam of the magnified angularly separated laser light beams has a first angle of incidence and a first region of incidence upon the second scan mirror, and a second laser light beam of the magnified angularly separated laser light beams has a second angle of incidence and a second region of incidence upon the second scan mirror.

18. The method of claim 17, wherein applying, with the optical relay, respectively different levels of magnification to each of the angularly separated laser light beams comprises:
applying, with a first reflective surface of the optical relay, a first level of magnification to a first beam diameter of the first laser light beam; and
applying, with a second reflective surface of the optical relay, a second level of magnification to a second beam diameter of the second laser light beam.

19. The method of claim 18, wherein the first region of incidence has a first area that is at least partly defined by the first beam diameter and the first angle of incidence, the second region of incidence has a second area that is at least partly defined by the second beam diameter and the second angle of incidence, and the first area is substantially similar to the second area.

20. The method of claim 17, wherein the first region of incidence and the second region of incidence are each bound by a reflective surface of the second scan mirror.

* * * * *

UNITED STATES PATENT AND TRADEMARK OFFICE
CERTIFICATE OF CORRECTION

PATENT NO. : 12,169,277 B2
APPLICATION NO. : 17/374078
DATED : December 17, 2024
INVENTOR(S) : Daniel Adema et al.

Page 1 of 1

It is certified that error appears in the above-identified patent and that said Letters Patent is hereby corrected as shown below:

In the Claims

Column 23 Line 52, Claim 5, please correct "incidence up on the first" to be --incidence upon the first--

Column 24 Line 31, Claim 12, please correct "incidence up on the scan" to be --incidence upon the scan--

Signed and Sealed this
Twenty-third Day of September, 2025

John A. Squires
*Director of the United States Patent and Trademark Office*